(12) United States Patent
Ketkar et al.

(10) Patent No.: US 9,379,420 B2
(45) Date of Patent: Jun. 28, 2016

(54) BATTERY SYSTEM AND METHOD FOR COOLING THE BATTERY SYSTEM

(71) Applicant: LG Chem, Ltd., Seoul (KR)

(72) Inventors: Satish Ketkar, Troy, MI (US); Paul Laurain, Sterling Heights, MI (US); Richard McCormick, Troy, MI (US)

(73) Assignee: LG Chem, Ltd., Seoul (KR)

(*) Notice: Subject to any disclaimer, the term of this patent is extended or adjusted under 35 U.S.C. 154(b) by 16 days.

(21) Appl. No.: 14/330,163

(22) Filed: Jul. 14, 2014

(65) Prior Publication Data

US 2014/0322563 A1 Oct. 30, 2014

Related U.S. Application Data

(63) Continuation-in-part of application No. 13/433,649, filed on Mar. 29, 2012, now Pat. No. 9,105,950.

(51) Int. Cl.
*F25B 1/00* (2006.01)
*H01M 10/6569* (2014.01)
(Continued)

(52) U.S. Cl.
CPC ........ *H01M 10/5079* (2013.01); *H01M 10/613* (2015.04); *H01M 10/6551* (2015.04); *H01M 10/6569* (2015.04); *F28D 2021/0028* (2013.01)

(58) Field of Classification Search
CPC ............. B60H 1/00278; F25B 39/022; F25B 2700/2117; F25B 2700/171; F25B 2600/02; F25B 2700/172; F25B 2700/173; F25B 2600/13; F25B 2600/021; F25B 2600/022; F25B 2600/024; F25B 2600/025
USPC ....................................... 62/228.1
See application file for complete search history.

(56) References Cited

U.S. PATENT DOCUMENTS

| 1,587,425 A | 6/1926 | Otto |
| 2,273,244 A | 2/1942 | Cornelius |

(Continued)

FOREIGN PATENT DOCUMENTS

| DE | 19639115 A | 3/1998 |
| DE | 102008034860 A1 | 1/2010 |

(Continued)

OTHER PUBLICATIONS

Written Opinion for International application No. PCT/KR2013002597 dated Feb. 2, 2015.

(Continued)

*Primary Examiner* — Marc Norman
*Assistant Examiner* — David Teitelbaum
(74) *Attorney, Agent, or Firm* — Buckert Patent & Trademark Law Firm, PC; John F. Buckert

(57) ABSTRACT

A battery system having a cooling plate with a conduit therein is provided. The system further includes a battery module having first and second battery cells. The system further includes a compressor, and a condenser coupled between the compressor and the conduit of the cooling plate. The system further includes a microprocessor that determines a maximum temperature level of the first and second battery cells, and determines a target temperature level for the cooling plate based on the maximum temperature level. The microprocessor determines a temperature error value based on a difference between a temperature level and the target temperature level of the cooling plate, and determines a desired RPM value for the compressor based on the temperature error value.

13 Claims, 27 Drawing Sheets

(51) Int. Cl.
*H01M 10/6551* (2014.01)
*H01M 10/613* (2014.01)
*F28D 21/00* (2006.01)

(56) References Cited

U.S. PATENT DOCUMENTS

| | | |
|---|---|---|
| 2,391,859 A | 1/1946 | Babcock |
| 3,503,558 A | 3/1970 | Galiulo et al. |
| 3,522,100 A | 7/1970 | Lindstrom |
| 3,550,681 A | 12/1970 | Stier et al. |
| 3,964,930 A | 6/1976 | Reiser |
| 4,009,752 A | 3/1977 | Wilson |
| 4,063,590 A | 12/1977 | Mcconnell |
| 4,298,904 A | 11/1981 | Koenig |
| 4,305,456 A | 12/1981 | Mueller et al. |
| 4,322,776 A | 3/1982 | Job et al. |
| 4,444,994 A | 4/1984 | Baker et al. |
| 4,518,663 A | 5/1985 | Kodali et al. |
| 4,646,202 A | 2/1987 | Hook et al. |
| 4,701,829 A | 10/1987 | Bricaud et al. |
| 4,777,561 A | 10/1988 | Murphy et al. |
| 4,849,858 A | 7/1989 | Grapes et al. |
| 4,982,785 A | 1/1991 | Tomlinson |
| 4,995,240 A | 2/1991 | Barthel et al. |
| 5,057,968 A | 10/1991 | Morrison |
| 5,071,652 A | 12/1991 | Jones et al. |
| 5,186,250 A | 2/1993 | Ouchi et al. |
| 5,214,564 A | 5/1993 | Metzler et al. |
| 5,270,131 A | 12/1993 | Diethelm et al. |
| 5,275,012 A * | 1/1994 | Dage et al. .................. 62/208 |
| 5,322,745 A | 6/1994 | Yanagihara et al. |
| 5,329,988 A | 7/1994 | Juger |
| 5,346,786 A | 9/1994 | Hodgetts |
| 5,356,735 A | 10/1994 | Meadows et al. |
| 5,392,873 A | 2/1995 | Masuyama et al. |
| 5,443,926 A | 8/1995 | Holland et al. |
| 5,510,203 A | 4/1996 | Hamada et al. |
| 5,520,976 A | 5/1996 | Giannetti et al. |
| 5,586,444 A * | 12/1996 | Fung ............................... 62/117 |
| 5,663,007 A | 9/1997 | Ikoma et al. |
| 5,736,836 A | 4/1998 | Hasegawa et al. |
| 5,756,227 A | 5/1998 | Suzuki et al. |
| 5,834,132 A * | 11/1998 | Hasegawa et al. .............. 429/62 |
| 5,937,664 A | 8/1999 | Matsuno et al. |
| 5,985,483 A | 11/1999 | Verhoog et al. |
| 6,038,871 A * | 3/2000 | Gutierrez et al. ............... 62/133 |
| 6,087,036 A | 7/2000 | Rouillard et al. |
| 6,111,387 A | 8/2000 | Kouzu et al. |
| 6,159,630 A | 12/2000 | Wyser |
| 6,176,095 B1 | 1/2001 | Porter |
| 6,289,979 B1 | 9/2001 | Kato |
| 6,344,728 B1 | 2/2002 | Kouzu et al. |
| 6,362,598 B2 | 3/2002 | Laig-Hoerstebrock et al. |
| 6,399,238 B1 | 6/2002 | Oweis et al. |
| 6,422,027 B1 | 7/2002 | Coates, Jr. et al. |
| 6,448,741 B1 | 9/2002 | Inui et al. |
| 6,462,949 B1 | 10/2002 | Parish, IV et al. |
| 6,512,347 B1 | 1/2003 | Hellmann et al. |
| 6,569,556 B2 | 5/2003 | Zhou et al. |
| 6,662,891 B2 | 12/2003 | Misu et al. |
| 6,689,510 B1 | 2/2004 | Gow et al. |
| 6,696,197 B2 | 2/2004 | Inagaki et al. |
| 6,724,172 B2 | 4/2004 | Koo |
| 6,750,630 B2 | 6/2004 | Inoue et al. |
| 6,775,998 B2 | 8/2004 | Yuasa et al. |
| 6,780,538 B2 | 8/2004 | Hamada et al. |
| 6,821,671 B2 | 11/2004 | Hinton et al. |
| 6,826,948 B1 | 12/2004 | Bhatti et al. |
| 6,878,485 B2 | 4/2005 | Ovshinsky et al. |
| 6,982,131 B1 | 1/2006 | Hamada et al. |
| 7,070,874 B2 | 7/2006 | Blanchet et al. |
| 7,143,724 B2 | 12/2006 | Hashizumi et al. |
| 7,150,935 B2 | 12/2006 | Hamada et al. |
| 7,250,741 B2 | 7/2007 | Koo et al. |
| 7,264,902 B2 | 9/2007 | Horie et al. |
| 7,278,389 B2 | 10/2007 | Kirakosyan |
| 7,467,525 B1 | 12/2008 | Ohta et al. |
| 7,531,270 B2 | 5/2009 | Buck et al. |
| 7,591,303 B2 | 9/2009 | Zeigler et al. |
| 7,795,845 B2 | 9/2010 | Cho |
| 7,797,958 B2 | 9/2010 | Alston et al. |
| 7,816,029 B2 | 10/2010 | Takamatsu et al. |
| 7,846,573 B2 | 12/2010 | Kelly |
| 7,879,480 B2 | 2/2011 | Yoon et al. |
| 7,883,793 B2 | 2/2011 | Niedzwiecki et al. |
| 7,976,978 B2 | 7/2011 | Shin et al. |
| 7,981,538 B2 | 7/2011 | Kim et al. |
| 7,997,367 B2 | 8/2011 | Nakamura |
| 8,007,915 B2 | 8/2011 | Kurachi |
| 8,011,467 B2 | 9/2011 | Asao et al. |
| 8,030,886 B2 | 10/2011 | Mahalingam et al. |
| 8,067,111 B2 | 11/2011 | Koetting et al. |
| 8,209,991 B2 | 7/2012 | Kondou et al. |
| 8,409,743 B2 | 4/2013 | Okada et al. |
| 8,663,829 B2 | 3/2014 | Koetting et al. |
| 2002/0073726 A1 * | 6/2002 | Hasebe et al. ................ 62/323.1 |
| 2002/0086201 A1 | 7/2002 | Payen et al. |
| 2002/0182493 A1 | 12/2002 | Ovshinsky et al. |
| 2003/0080714 A1 | 5/2003 | Inoue et al. |
| 2003/0189104 A1 | 10/2003 | Watanabe et al. |
| 2003/0211384 A1 | 11/2003 | Hamada et al. |
| 2004/0069474 A1 | 4/2004 | Wu et al. |
| 2004/0237550 A1 * | 12/2004 | Yamasaki et al. ............. 62/228.1 |
| 2005/0026014 A1 | 2/2005 | Fogaing et al. |
| 2005/0089750 A1 | 4/2005 | Ng et al. |
| 2005/0103486 A1 | 5/2005 | Demuth et al. |
| 2005/0110460 A1 | 5/2005 | Arai et al. |
| 2005/0134038 A1 | 6/2005 | Walsh |
| 2006/0234119 A1 | 10/2006 | Kruger et al. |
| 2006/0286450 A1 | 12/2006 | Yoon et al. |
| 2007/0012055 A1 * | 1/2007 | Schenk et al. .................. 62/208 |
| 2007/0062681 A1 | 3/2007 | Beech |
| 2007/0087266 A1 | 4/2007 | Bourke et al. |
| 2007/0095073 A1 * | 5/2007 | Tian et al. ......................... 62/6 |
| 2007/0209378 A1 * | 9/2007 | Larson ............................ 62/239 |
| 2007/0227166 A1 | 10/2007 | Rafalovich et al. |
| 2008/0003491 A1 | 1/2008 | Yahnker et al. |
| 2008/0041079 A1 | 2/2008 | Nishijima et al. |
| 2008/0110189 A1 | 5/2008 | Alston et al. |
| 2008/0182151 A1 | 7/2008 | Mizusaki et al. |
| 2008/0248338 A1 | 10/2008 | Yano et al. |
| 2008/0299446 A1 | 12/2008 | Kelly |
| 2008/0314071 A1 | 12/2008 | Ohta et al. |
| 2009/0074478 A1 | 3/2009 | Kurachi |
| 2009/0087727 A1 | 4/2009 | Harada et al. |
| 2009/0104512 A1 | 4/2009 | Fassnacht et al. |
| 2009/0123819 A1 | 5/2009 | Kim |
| 2009/0155680 A1 | 6/2009 | Maguire et al. |
| 2009/0186265 A1 | 7/2009 | Koetting et al. |
| 2009/0258288 A1 | 10/2009 | Weber et al. |
| 2009/0258289 A1 | 10/2009 | Weber et al. |
| 2009/0280395 A1 | 11/2009 | Nemesh et al. |
| 2009/0325051 A1 | 12/2009 | Niedzwiecki et al. |
| 2009/0325052 A1 | 12/2009 | Koetting et al. |
| 2009/0325054 A1 | 12/2009 | Payne et al. |
| 2009/0325055 A1 | 12/2009 | Koetting et al. |
| 2010/0112419 A1 | 5/2010 | Jang et al. |
| 2010/0203376 A1 | 8/2010 | Choi et al. |
| 2010/0209760 A1 | 8/2010 | Yoshihara et al. |
| 2010/0262791 A1 | 10/2010 | Gilton |
| 2010/0275619 A1 | 11/2010 | Koetting et al. |
| 2010/0276132 A1 | 11/2010 | Payne |
| 2010/0279152 A1 | 11/2010 | Payne |
| 2010/0279154 A1 | 11/2010 | Koetting et al. |
| 2010/0304203 A1 | 12/2010 | Buck et al. |
| 2010/0307723 A1 | 12/2010 | Thomas et al. |
| 2011/0000241 A1 | 1/2011 | Favaretto |
| 2011/0020676 A1 | 1/2011 | Kurosawa |
| 2011/0027631 A1 | 2/2011 | Koenigsmann |
| 2011/0027640 A1 | 2/2011 | Gadawski et al. |
| 2011/0041525 A1 | 2/2011 | Kim et al. |
| 2011/0045326 A1 | 2/2011 | Leuthner et al. |
| 2011/0052959 A1 | 3/2011 | Koetting et al. |
| 2011/0052960 A1 | 3/2011 | Kwon et al. |

(56) References Cited

U.S. PATENT DOCUMENTS

| | | | |
|---|---|---|---|
| 2011/0189523 A1 | 8/2011 | Eom | |
| 2011/0293982 A1 | 12/2011 | Martz et al. | |
| 2011/0293983 A1 | 12/2011 | Oury et al. | |
| 2012/0082880 A1 | 4/2012 | Koetting et al. | |
| 2012/0171543 A1 | 7/2012 | Hirsch et al. | |
| 2012/0183830 A1 | 7/2012 | Schaefer et al. | |
| 2013/0045410 A1 | 2/2013 | Yang et al. | |
| 2013/0136136 A1 | 5/2013 | Ando et al. | |
| 2013/0255293 A1 | 10/2013 | Gadawski et al. | |
| 2013/0309542 A1 | 11/2013 | Merriman et al. | |
| 2014/0050953 A1 | 2/2014 | Yoon et al. | |
| 2014/0050966 A1 | 2/2014 | Merriman et al. | |
| 2014/0120390 A1 | 5/2014 | Merriman et al. | |
| 2014/0147709 A1 | 5/2014 | Ketkar et al. | |
| 2014/0227575 A1 | 8/2014 | Ketkar | |
| 2014/0308558 A1 | 10/2014 | Merriman et al. | |
| 2015/0010801 A1 | 1/2015 | Arena et al. | |

FOREIGN PATENT DOCUMENTS

| | | | |
|---|---|---|---|
| DE | 102009006426 A1 | 7/2010 | |
| EP | 1577966 A | 9/2005 | |
| EP | 1852925 A | 11/2007 | |
| EP | 2065963 A2 | 6/2009 | |
| EP | 2200109 A2 | 6/2010 | |
| EP | 2262048 A | 12/2010 | |
| GB | 481891 A | 3/1938 | |
| JP | 08111244 A | 4/1996 | |
| JP | H09129213 A | 5/1997 | |
| JP | H09219213 A | 8/1997 | |
| JP | 2001023703 | 1/2001 | |
| JP | 2001105843 A | 4/2001 | |
| JP | 2002038033 A | 2/2002 | |
| JP | 2002319383 A | 10/2002 | |
| JP | 2002333255 A | 11/2002 | |
| JP | 2003188323 A | 7/2003 | |
| JP | 2003282112 A | 10/2003 | |
| JP | 2004333115 A | 11/2004 | |
| JP | 2005126315 A | 5/2005 | |
| JP | 2005147443 A | 6/2005 | |
| JP | 2005349955 A | 12/2005 | |
| JP | 2006139928 A | 6/2006 | |
| JP | 2007305425 A | 11/2007 | |
| JP | 2008054379 A | 3/2008 | |
| JP | 2008062875 A | 3/2008 | |
| JP | 2008080995 A | 4/2008 | |
| JP | 2008159440 A | 7/2008 | |
| JP | 2009009889 A | 1/2009 | |
| JP | 2009054297 A | 3/2009 | |
| JP | 2009238644 | 10/2009 | |
| JP | 2012015096 | 10/2009 | |
| JP | 2012018915 | 1/2012 | |
| KR | 20050092605 A | 9/2005 | |
| KR | 100637472 B1 | 10/2006 | |
| KR | 100765659 B1 | 10/2007 | |
| KR | 20080047641 A | 5/2008 | |
| KR | 20090082212 A | 7/2009 | |
| KR | 100921346 B1 | 10/2009 | |
| KR | 20090107443 A | 10/2009 | |
| KR | 20100119497 A | 9/2010 | |
| KR | 20100119498 A | 9/2010 | |
| KR | 1020100119497 A | 11/2010 | |
| KR | 1020100119498 A | 11/2010 | |
| KR | 1020110013269 A | 2/2011 | |
| KR | 1020110013270 A | 2/2011 | |
| KR | 20110013269 A | 9/2011 | |
| KR | 20110126764 A | 11/2011 | |
| WO | 2006101343 A | 9/2006 | |
| WO | 2007007503 A | 1/2007 | |
| WO | 2007115743 A2 | 10/2007 | |
| WO | 2008111162 A | 9/2008 | |
| WO | 2009073225 A | 6/2009 | |
| WO | 2011145830 A2 | 11/2011 | |

OTHER PUBLICATIONS

"Gasket". Merriam-Webster. Merriam-Webster. Web. May 30, 2012. <http://www.merriam-webster.com/dictionary/gasket>.

International Search Report for International application No. PCT/KR2013/004015 dated Sep. 26, 2013.

International Search Report; International Application No. PCT/KR2009/000258; International Filing Date: Jan. 16, 2009; Date of Mailing: Aug. 28, 2009; 2 pages.

International Search Report; International Application No. PCT/KR2009/003428, International Filing Date: Jun. 25, 2009; Date of Mailing: Jan. 22, 2010; 2 pages.

International Search Report; International Application No. PCT/KR2009/003429; International Filing Date: Jun. 25, 2009; Date of Mailing: Jan. 12, 2010; 3 pages.

International Search Report; International Application No. PCT/KR2009/003430; International Filing Date: Jun. 25, 2009; Date of Mailing: Feb. 3, 2010; 2 pages.

International Search Report; International Application No. PCT/KR2009/003434; International Filing Date: Jun. 25, 2009; Date of Mailing: Jan. 18, 2010; 2 pages.

International Search Report; International Application No. PCT/KR2009/003436; International Filing Date: Jun. 25, 2009; Date of Mailing: Jan. 22, 2010; 2 pages.

International Search Report; International Application No. PCT/KR2009/006121; International Filing Date: Oct. 22, 2009; Date of Mailing: May 3, 2010; 2 pages.

International Search Report; International Application No. PCT/KR2010/002334; International Filing Date: Apr. 15, 2010; Date of Mailing: Nov. 29, 2010; 2 pages.

International Search Report; International Application No. PCT/KR2010/002336; International Filing Date: Apr. 15, 2010; Date of Mailing: Jan. 31, 2011; 2 pages.

International Search Report; International Application No. PCT/KR2010/002337; International Filing Date: Apr. 15, 2010; Date of Mailing: May 3, 2010; 2 pages.

International Search Report; International Application No. PCT/KR2010/002340; International Filing Date: Apr. 15, 2010; Date of Mailing: Jan. 31, 2011; 2 pages.

International Search Report; International Application No. PCT/KR2010/004944; International Filing Date: Jul. 28, 2010; Date of Mailing: Apr. 29, 2011; 2 pages.

International Search Report; International Application No. PCT/KR2010/005639; International Filing Date: Aug. 24, 2010; Date of Mailing: Jun. 3, 2011; 2 pages.

Written Opinion for International application No. PCT/KR2014/002090 dated May 26, 2014.

* cited by examiner

BATTERY SYSTEM AND METHOD FOR COOLING THE BATTERY SYSTEM

CROSS-REFERENCE TO RELATED APPLICATIONS

This application is a continuation-on-part of U.S. patent application Ser. No. 13/433,649 filed on Mar. 29, 2012, the entire contents of which are hereby incorporated by reference herein.

BACKGROUND

The inventors herein have recognized a need for an improved battery system and a method for cooling the battery system.

SUMMARY

A battery system in accordance with an exemplary embodiment is provided. The battery system includes a cooling plate having a conduit therein. The battery system further includes a battery module having a housing, first and second battery cells, and a solid cooling fin. The housing is configured to hold the first and second battery cells therein. The solid cooling fin has first and second panel portions. The first panel portion is disposed against the first battery cell. The second panel portion extends through the housing and is disposed on the cooling plate. The solid cooling fin is configured to conduct heat energy from the first battery cell to the cooling plate. The battery system further includes a compressor fluidly coupled to the conduit of the cooling plate. The battery system further includes a condenser fluidly coupled between both the compressor and the conduit of the cooling plate. The battery system further includes a first temperature sensor adapted to generate a first temperature signal indicative of a first temperature level of the first battery cell. The battery system further includes a second temperature sensor adapted to generate a second temperature signal indicative of a second temperature level of the second battery cell. The battery system further includes a third temperature sensor adapted to generate a third temperature signal indicative of a third temperature level of the cooling plate. The battery system further includes a microprocessor operably coupled to the compressor and the first, second, and third temperature sensors. The microprocessor is programmed to determine a maximum temperature level of the first and second temperature levels based on the first and second temperature signals. The microprocessor is further programmed to determine a target temperature level for the cooling plate based on the maximum temperature level. The microprocessor is further programmed to determine a temperature error value based on a difference between the third temperature level of the cooling plate and the target temperature level of the cooling plate. The microprocessor is further programmed to determine a desired RPM value for the compressor based on the temperature error value. The microprocessor is further programmed to generate a control signal to induce the compressor to operate at an RPM corresponding to the desired RPM value, such that the compressor pumps a refrigerant through the condenser and the conduit of the cooling plate to cool the first and second battery cells.

A method for cooling a battery system in accordance with another exemplary embodiment is provided. The battery system has a cooling plate, a battery module, a compressor, a condenser, first, second, and third temperature sensors, and a microprocessor. The cooling plate has a conduit therein. The battery module has a housing, first and second battery cells, and a solid cooling fin. The housing is configured to hold the first and second battery cells therein. The solid cooling fin has first and second panel portions. The first panel portion is disposed against the first battery cell. The second panel portion extends through the housing and is disposed on the cooling plate. The solid cooling fin is configured to conduct heat energy from the first battery cell to the cooling plate. The compressor is fluidly coupled to the conduit of the cooling plate. The condenser is fluidly coupled between both the compressor and the conduit of the cooling plate. The method includes generating a first temperature signal indicative of a first temperature level of the first battery cell, utilizing the first temperature sensor. The method further includes generating a second temperature signal indicative of a second temperature level of the second battery cell, utilizing the second temperature sensor. The method further includes generating a third temperature signal indicative of a third temperature level of the cooling plate, utilizing the third temperature sensor. The method further includes determining a maximum temperature level of the first and second temperature levels based on the first and second temperature signals, utilizing the microprocessor. The method further includes determining a target temperature level for the cooling plate based on the maximum temperature level, utilizing the microprocessor. The method further includes determining a temperature error value based on a difference between the third temperature level of the cooling plate and the target temperature level of the cooling plate, utilizing the microprocessor. The method further includes determining a desired RPM value for the compressor based on the temperature error value, utilizing the microprocessor. The method further includes generating a control signal to induce the compressor to operate at an RPM corresponding to the desired RPM value to cool the first and second battery cells, utilizing the microprocessor, such that the compressor pumps a refrigerant through the condenser and the conduit of the cooling plate to cool the first and second battery cells.

DETAILED DESCRIPTION

Figure 1:
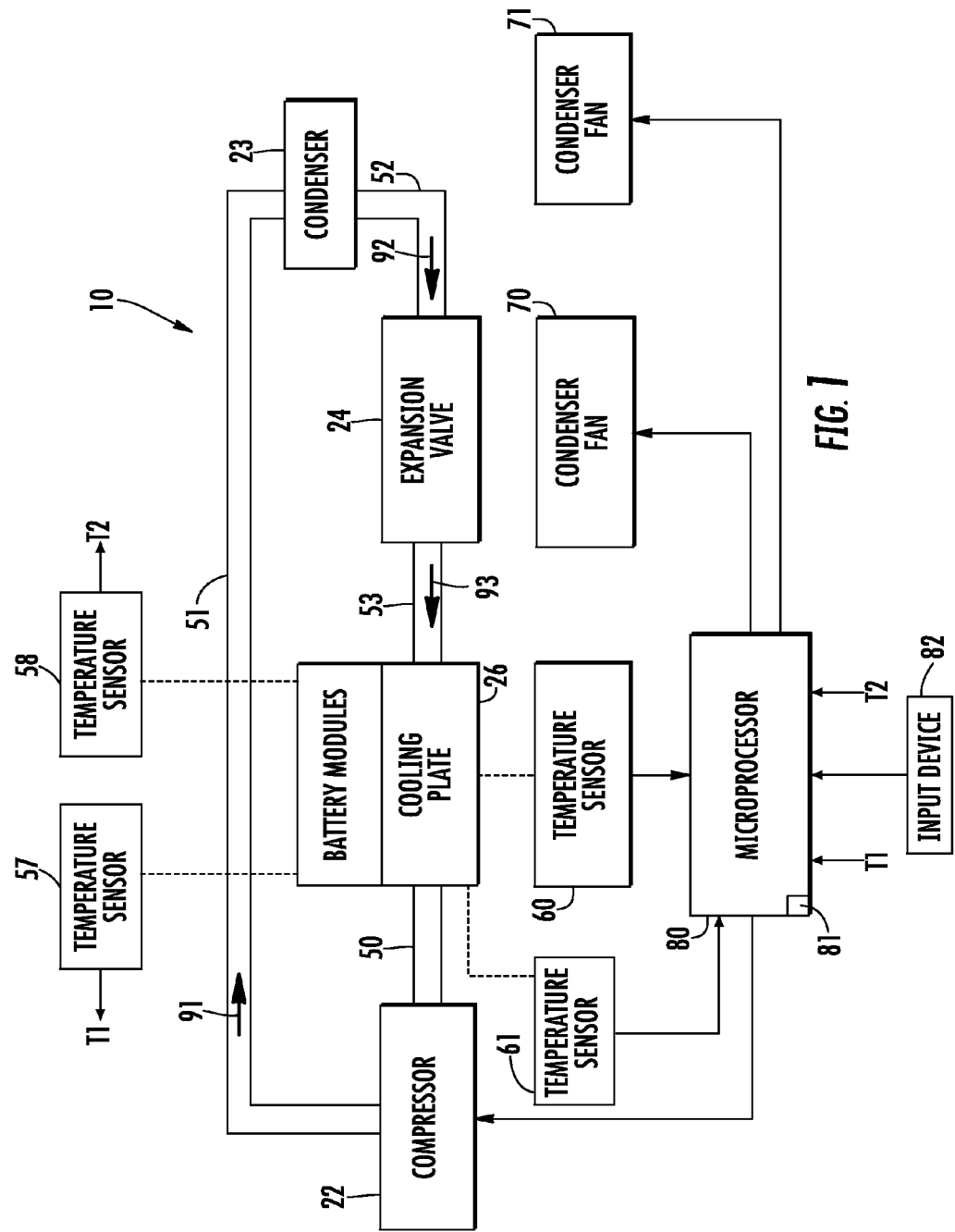
FIG. 1 is a block diagram of a battery system in accordance with an exemplary embodiment.
Figure 2:
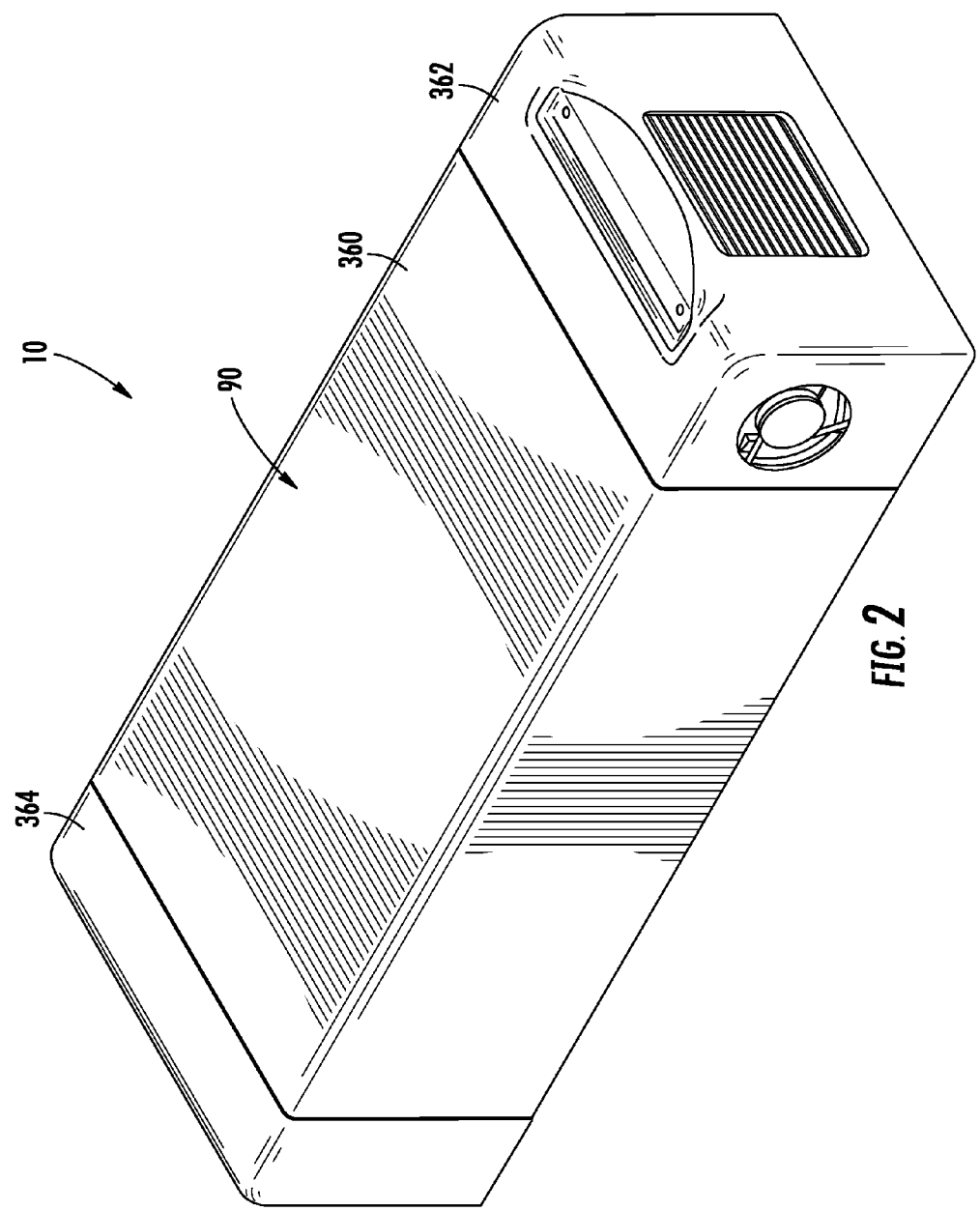
FIG. 2 is a schematic of an external enclosure utilized in the battery system of FIG. 1.
Figure 3:
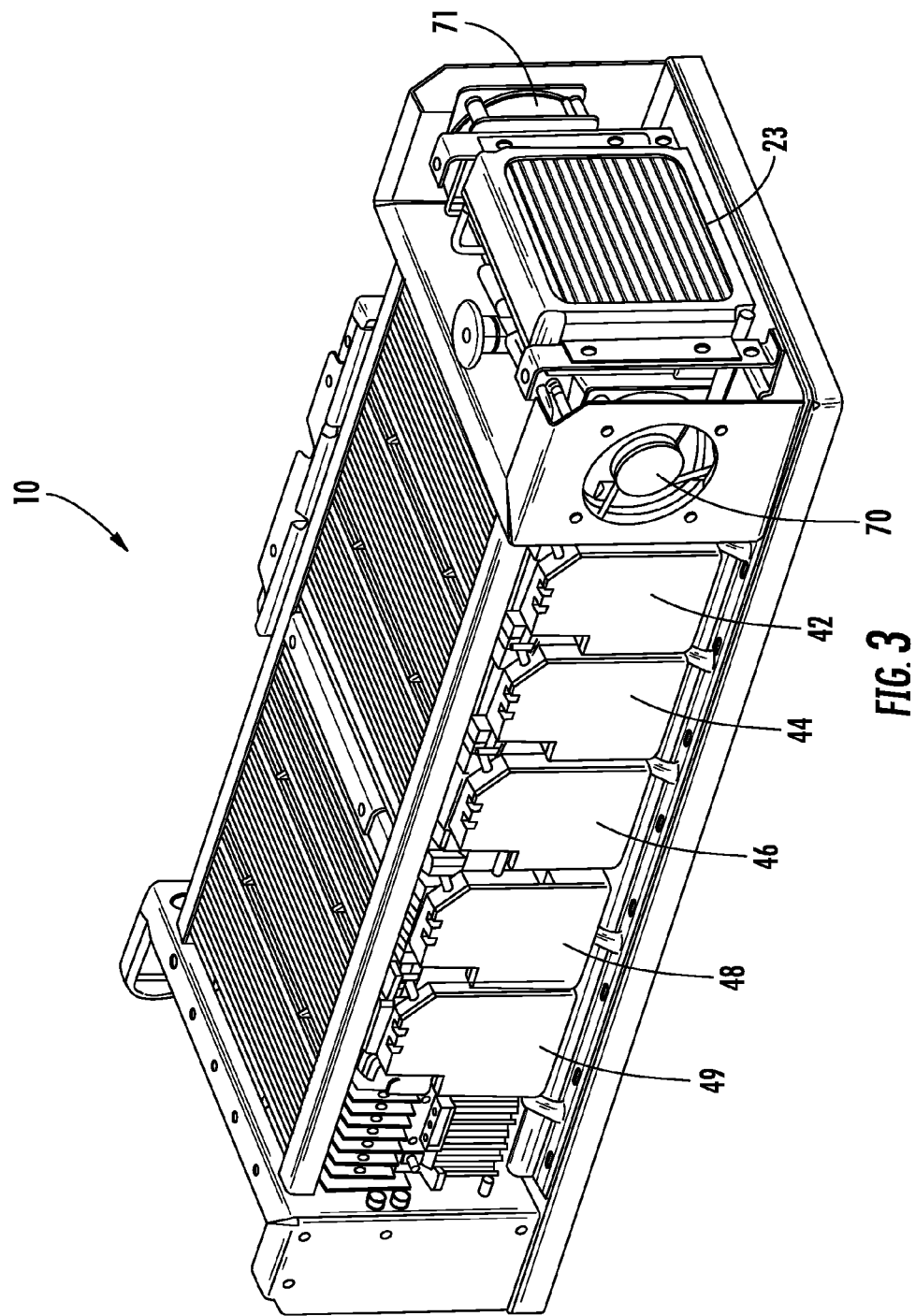
FIG. 3 is schematic of a portion of the battery system of FIG. 1.
Figure 4:
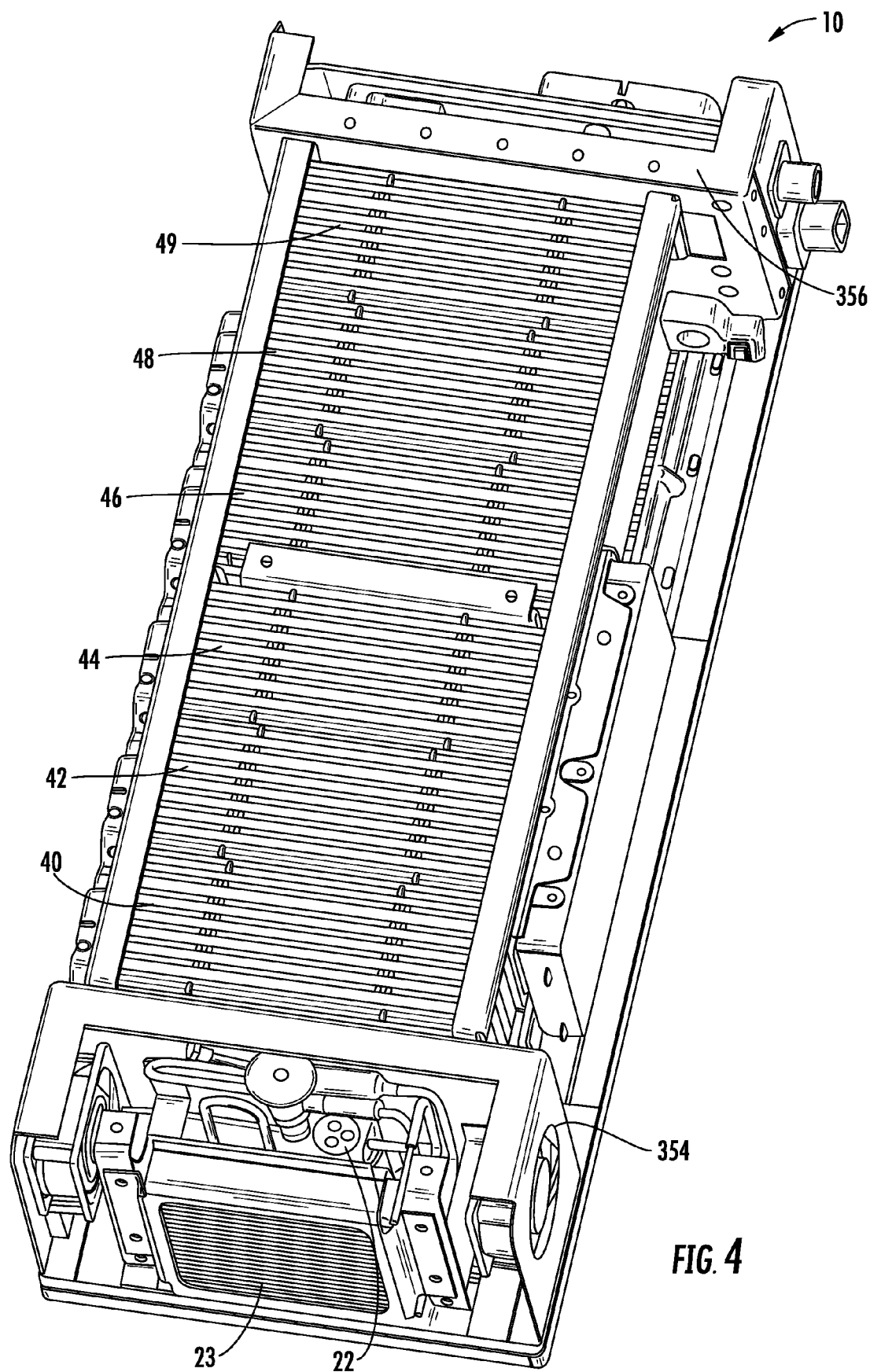
FIG. 4 is an enlarged schematic of a portion of the battery system of FIG. 1.

Referring to FIGS. 1-6, a battery system 10 for generating electrical power in accordance with an exemplary embodiment is illustrated. The battery system 10 includes a compressor 22, a condenser 23, an expansion valve 24, a cooling plate 26, an insulative layer 28, battery modules 40, 42, 44, 46, 48, 49, conduits 50, 51, 52, 53, a temperature sensor 60, condenser fans 70, 71, a microprocessor 80, an input device 82, and an external enclosure 90. An advantage of the battery system 10 is that the system 10 utilizes the microprocessor 80 programmed to determine a target temperature level for the cooling plate 26 based on a maximum temperature level of battery cells, and determines a temperature error value based on a difference between the current temperature level of the cooling plate 26 and the target temperature level of the cooling plate 26, and determines a desired RPM value for the compressor 22 based on the temperature error value, to effectively cool the battery cells in the system 10.

For purposes of understanding, the term "refrigerant" corresponds to a substance that can reversibly transition between a liquid and a gas in a heat cycle. Exemplary refrigerants include R-11, R-12, R-22, R-134A, R-407C and R-410A. Also, the term "gaseous-liquid refrigerant" corresponds to a refrigerant having a mixture of gas and liquid.

The compressor 22 is configured to pump and compress a gaseous refrigerant 91 through the conduit 51 into the condenser 23 in response to a control signal from the microprocessor 80. As shown, the conduit 51 is fluidly coupled between the compressor 22 and the condenser 23. In an alternative embodiment, one or more additional compressors could be fluidly coupled in parallel with the compressor 22 between the cooling plate 26 and the condenser 23. In the alternative embodiment, each of the compressors could be operated at a substantially similar operational speed. Further, in particular, an additional compressor could be fluidly coupled in parallel with the compressor 22, and further fluidly coupled to the conduits 50, 51.

The condenser 23 is provided to receive the gaseous refrigerant 91 from the compressor 22 via the conduit 51 and to transition the gaseous refrigerant 91 into a liquid refrigerant 92 by extracting heat energy from the gaseous refrigerant 91. As shown, the conduit 52 is fluidly coupled between the condenser 23 and the expansion valve 24. After exiting the condenser 24, the liquid refrigerant 92 is further pumped through the conduit 52 to the expansion valve 24.

The expansion valve 24 is fluidly coupled between the condenser 23 and the cooling plate 26 via the conduits 52, 53. The expansion valve 24 is configured to receive the liquid refrigerant 92 from the condenser 23 and to decrease a pressure level of the liquid refrigerant 92 to transition the liquid refrigerant 92 into a gaseous-liquid refrigerant 93. The gaseous-liquid refrigerant 93 is routed from the expansion valve 24 to the conduit 110 of the cooling plate 26 via the conduit 53.

Referring to FIGS. 1, 5 and 7-11, the cooling plate 26 is configured to receive the gaseous-liquid refrigerant 93 and to transition the gaseous-liquid refrigerant 93 into the gaseous refrigerant 91 utilizing the heat energy received from solid cooling fins 230-244 in the battery modules 40-49. As a result, the cooling plate 26 cools the battery modules 40-49 via the solid cooling fins 230-244 that conduct heat energy from the battery modules 40-49 to the cooling plate 26. The cooling plate 26 includes a plate portion 100 and a conduit 110. The plate portion 100 has a first side 120 and a second side 122. The plate portion 100 further includes a channel 123 (shown in FIG. 11) that extends from the first side 120 into the plate portion 100. The conduit 110 is disposed in the channel 123 and thermally communicates with the plate portion 100. In one exemplary embodiment, the channel 123 is a serpentine-shaped channel and the conduit 110 is a serpentine-shaped conduit. The conduit 100 is fluidly coupled to the conduit 50 which is further fluidly coupled to the compressor 22. During operation, the gaseous refrigerant 91 from the cooling plate 26 is routed through the conduit 50 to the compressor 22. In one exemplary embodiment, the plate portion 100 is constructed of aluminum and the conduit 110 is constructed of copper. Of course, in alternative embodiments, the plate portion 100 and the conduit 110 could be constructed of other thermally conductive materials known to those skilled in the art. As shown, the cooling plate 26 is disposed on the insulative layer 28. The insulative layer 28 is disposed on a bottom enclosure portion 350 and supports the cooling plate 26 thereon. The insulative layer 28 thermally insulates the cooling plate 26 from the bottom enclosure portion 350.

Referring to FIG. 1, the temperature sensor 57 is provided to generate a signal indicative of a temperature level at a first location on the cooling plate 26 that is received by the microprocessor 80.

The temperature sensor 58 is provided to generate a signal indicative of a temperature level at a second location on the cooling plate 26 that is received by the microprocessor 80.

Figure 5:
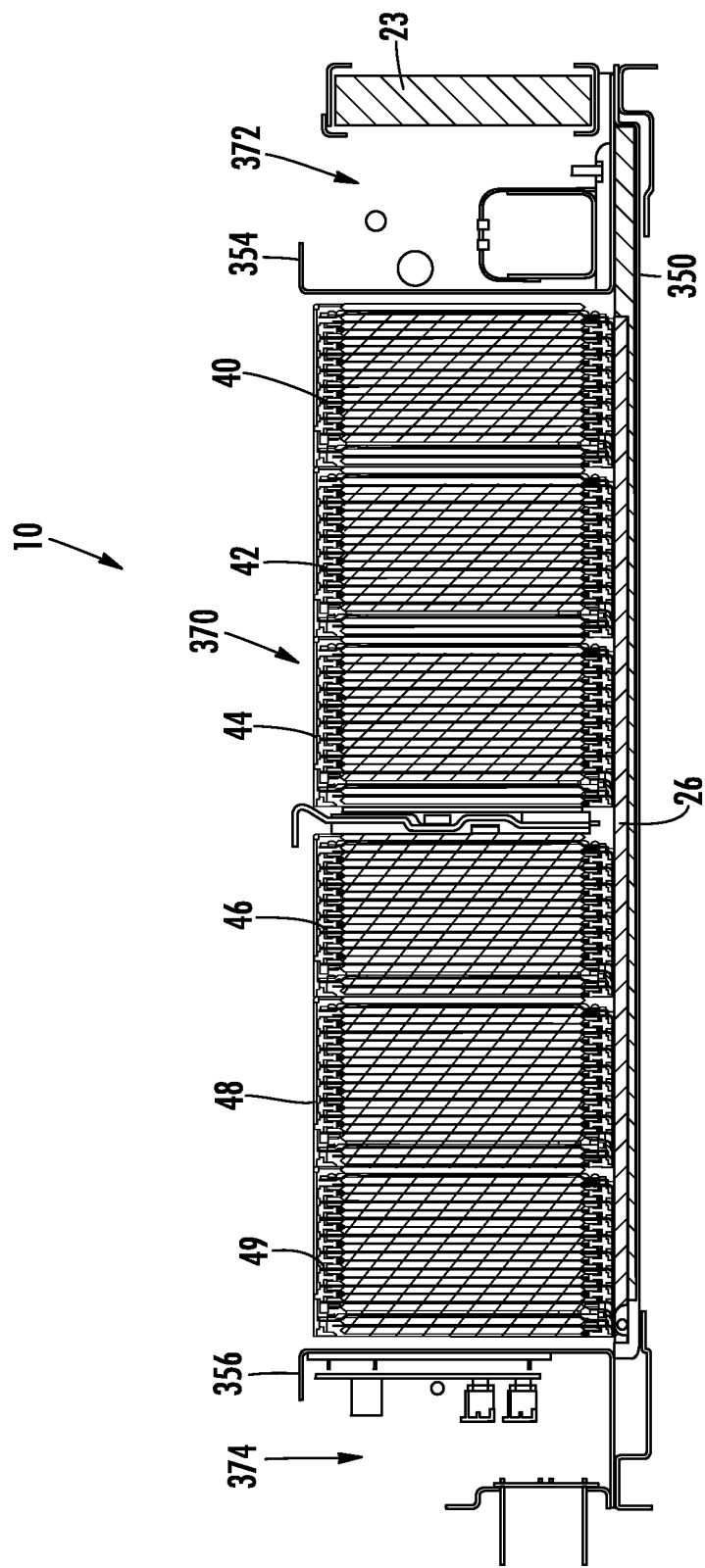
FIG. 5 is a cross-sectional schematic of a portion of the battery system of FIG. 1.
Figure 6:
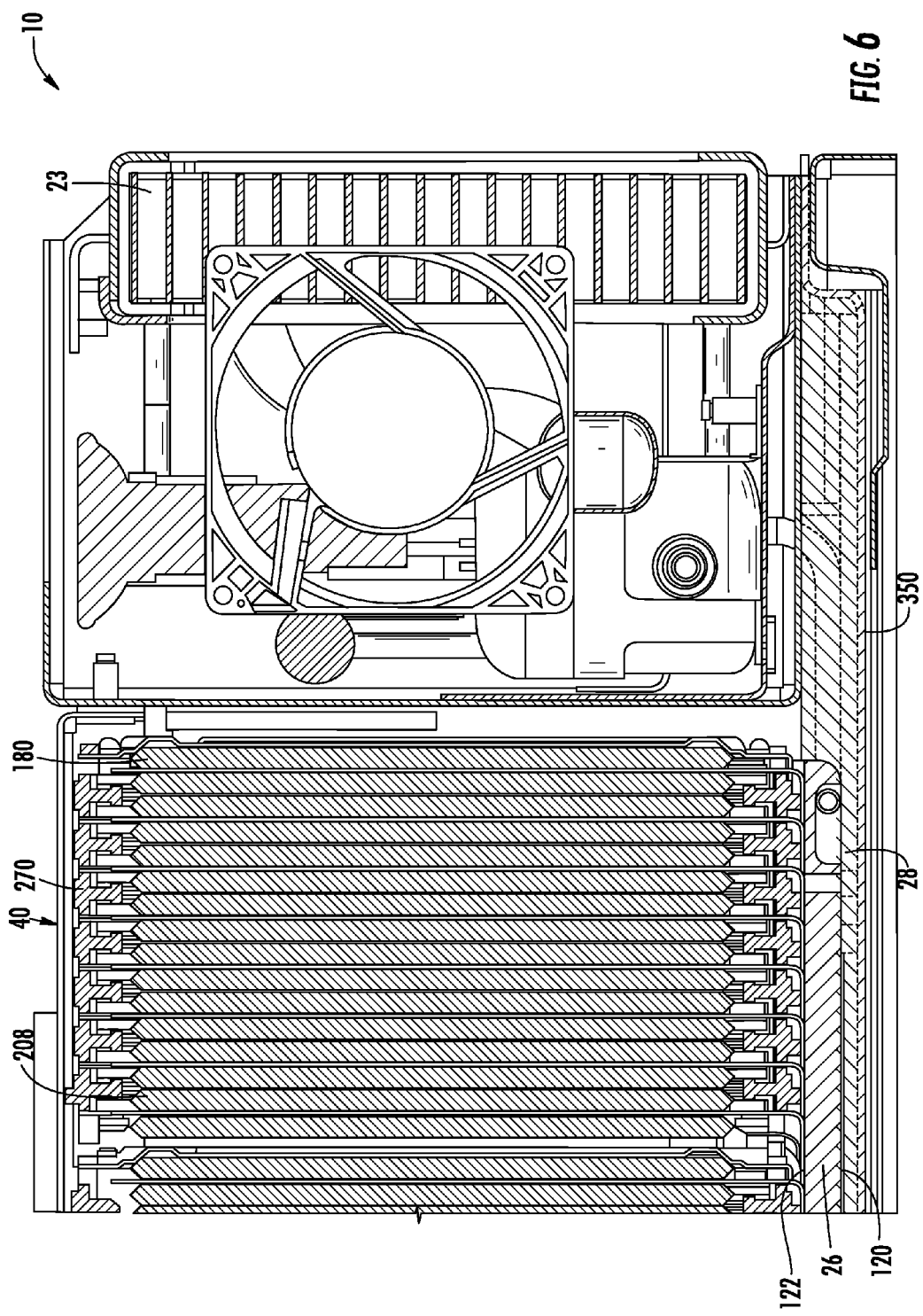
FIG. 6 is an enlarged cross-sectional schematic of a portion of the battery system of FIG. 1.
Figure 7:
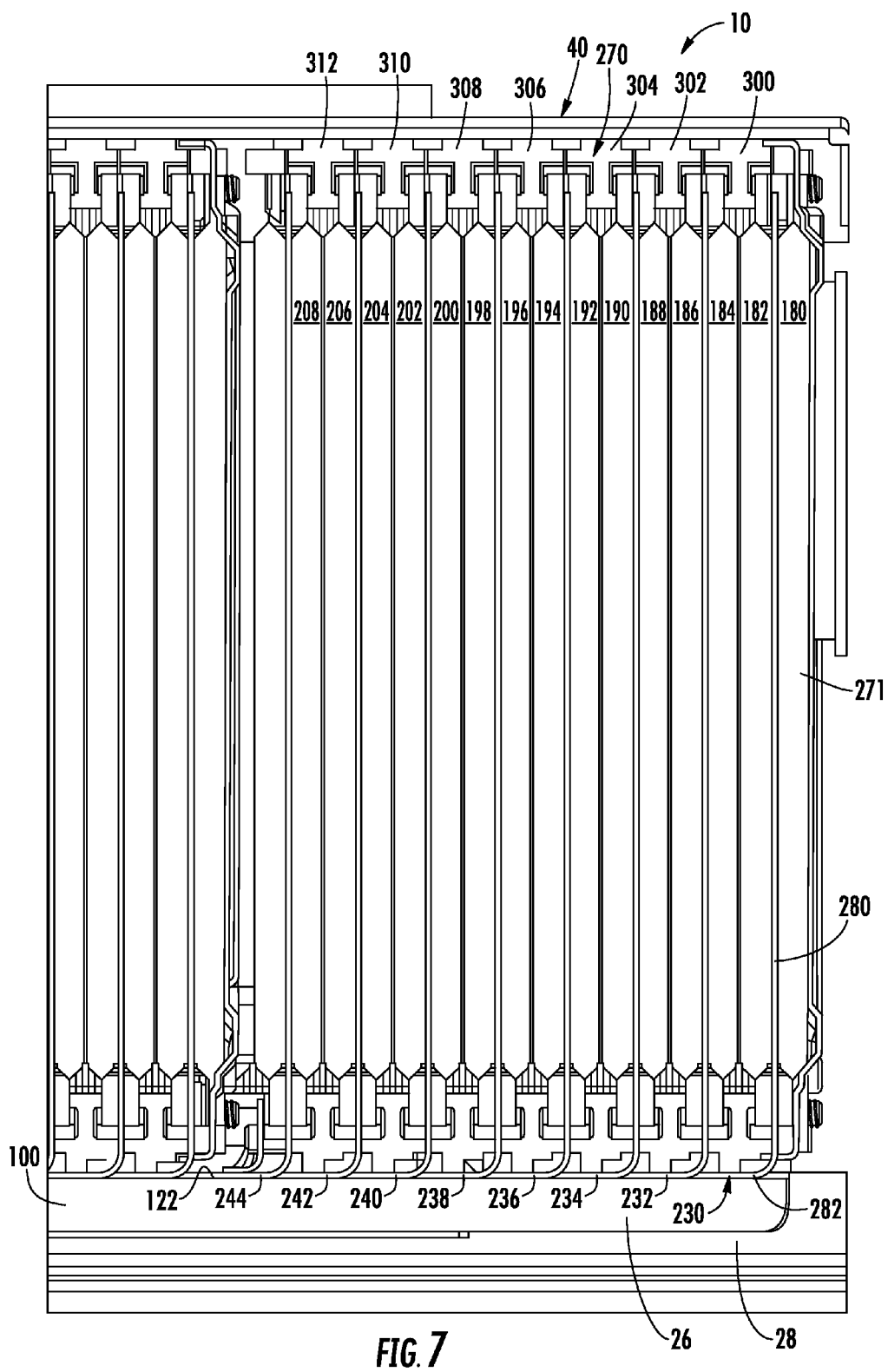
FIG. 7 is another enlarged cross-sectional schematic of a portion of the battery system of FIG. 1.
Figure 8:
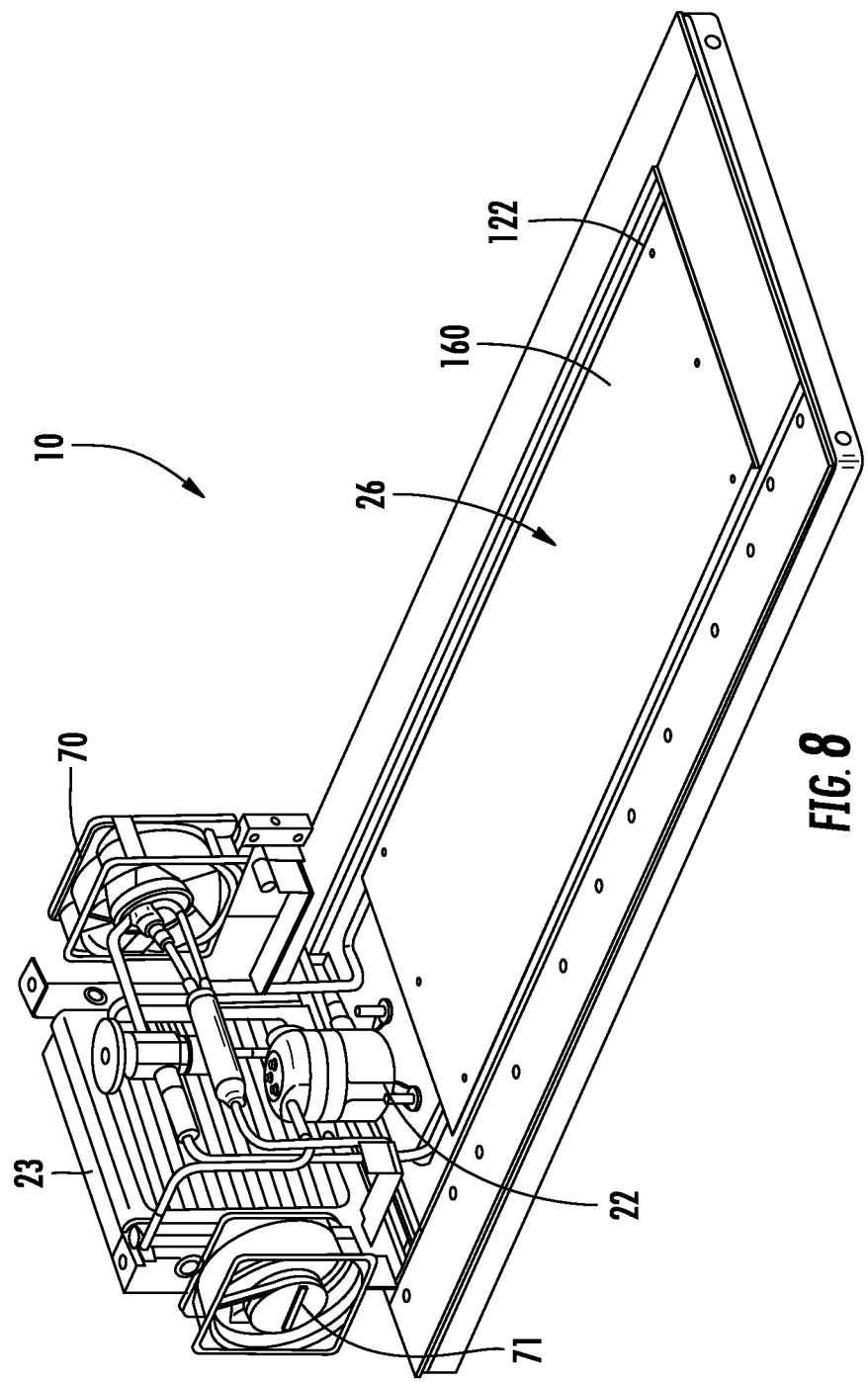
FIG. 8 is a schematic of a portion of the battery system of FIG. 1.
Figure 9:
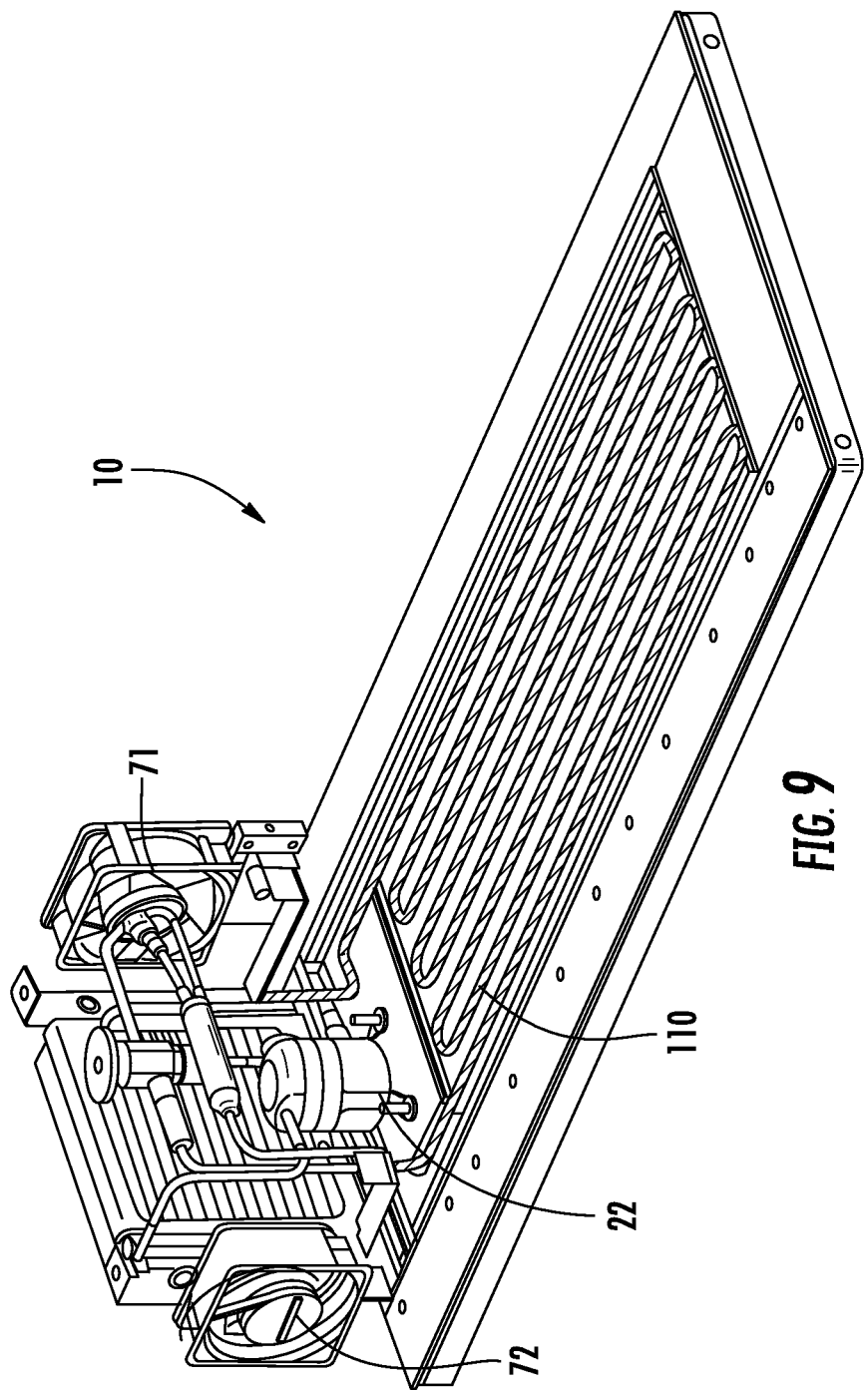
FIG. 9 is another schematic of a portion of the battery system of FIG. 1.
Figure 10:
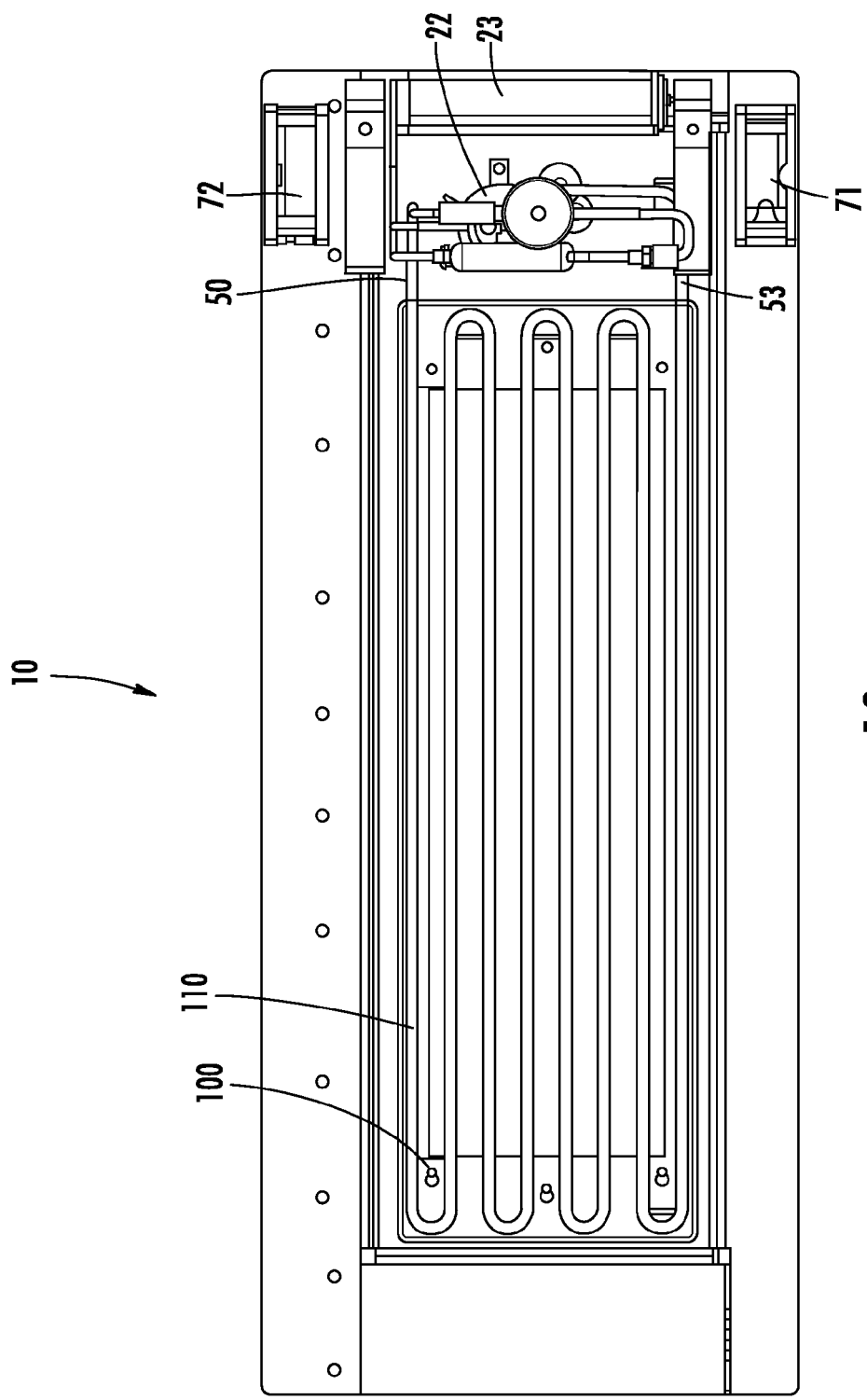
FIG. 10 is another schematic of a portion of the battery system of FIG. 1.
Figure 11:
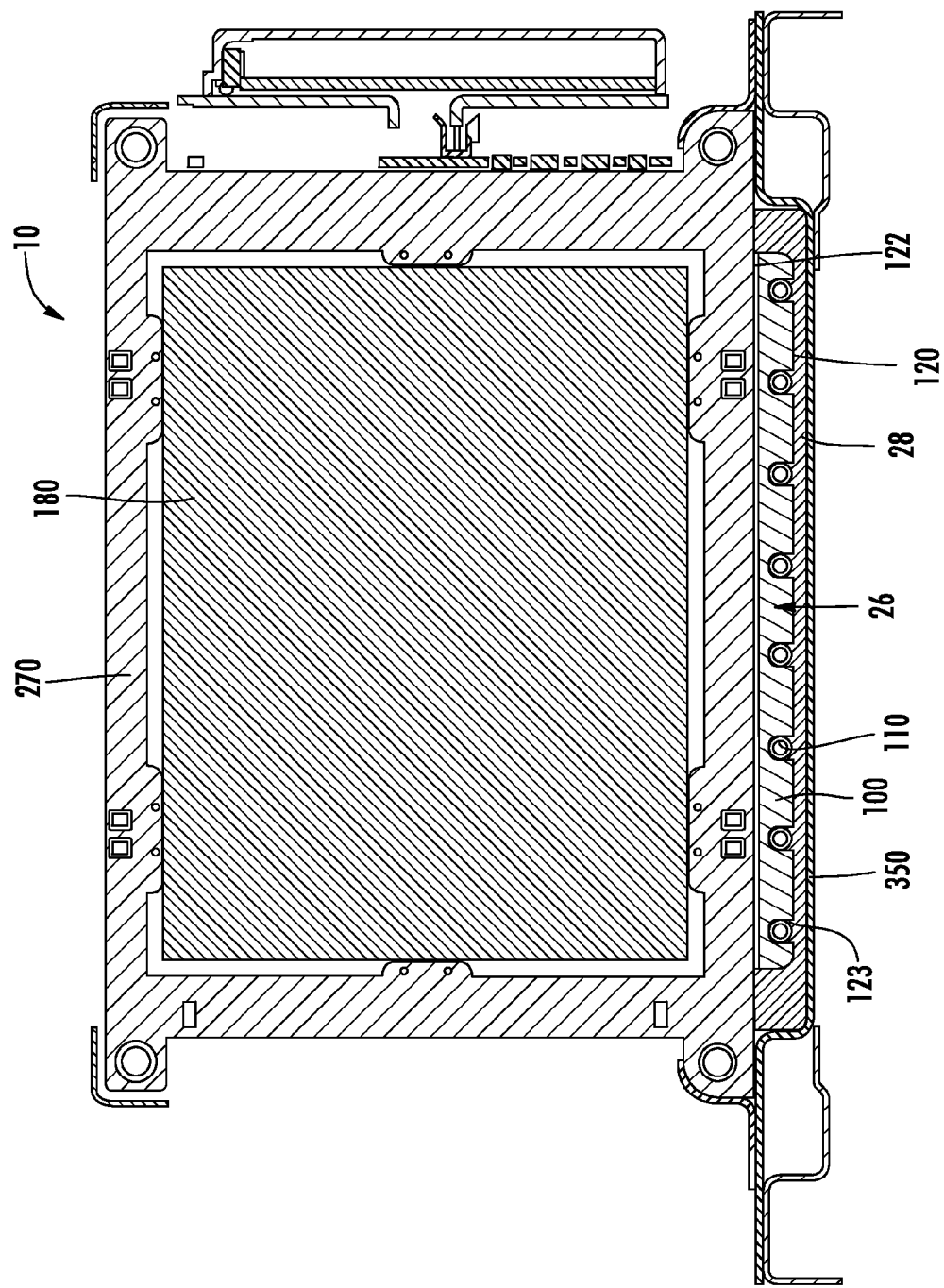
FIG. 11 is a cross-sectional schematic of a portion of the battery system of FIG. 1.
Figure 12:
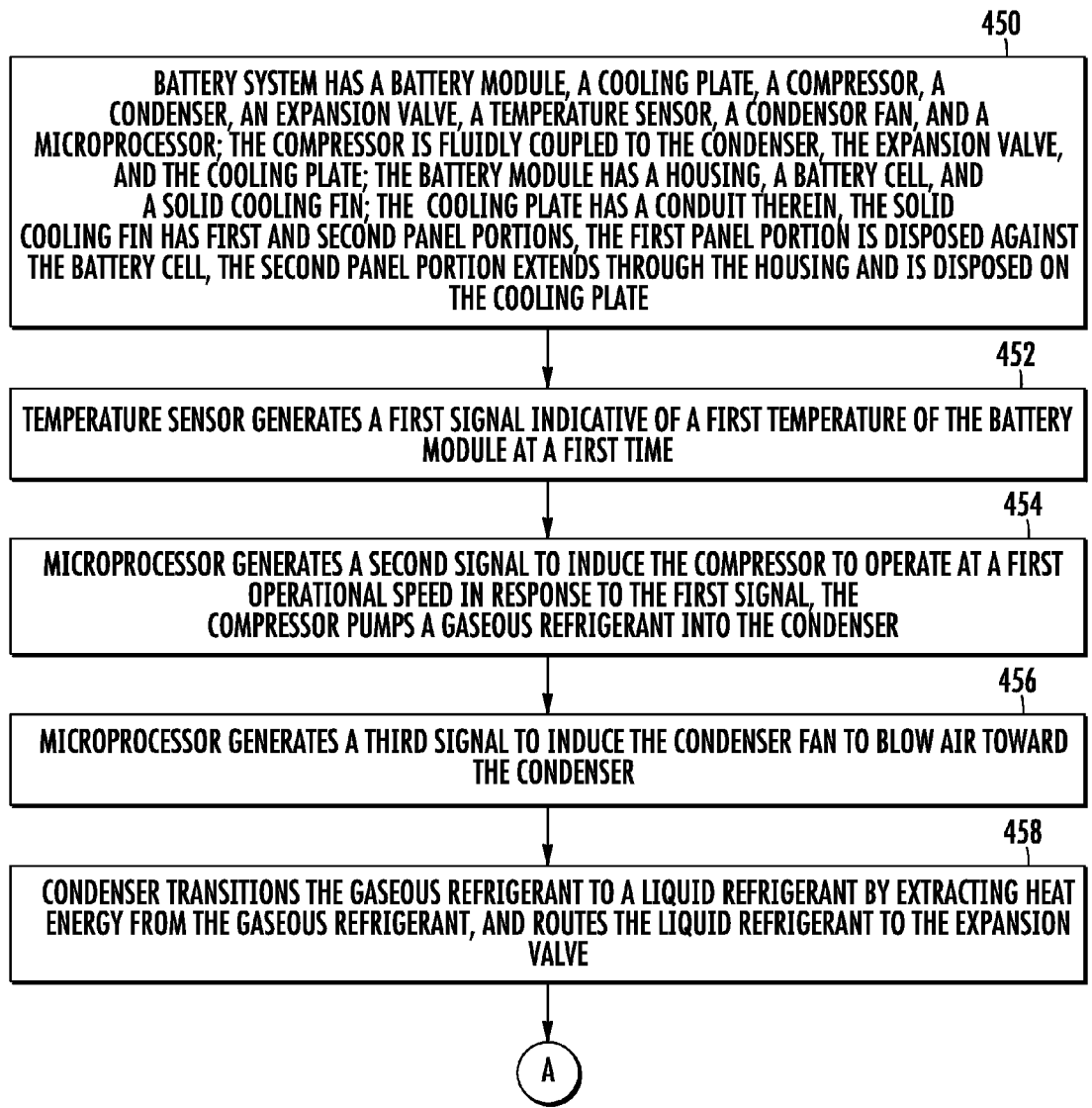
FIGS. 12-14 are flowcharts of a method for cooling the battery system of FIG. 1 in accordance with another exemplary embodiment.
Figure 13:
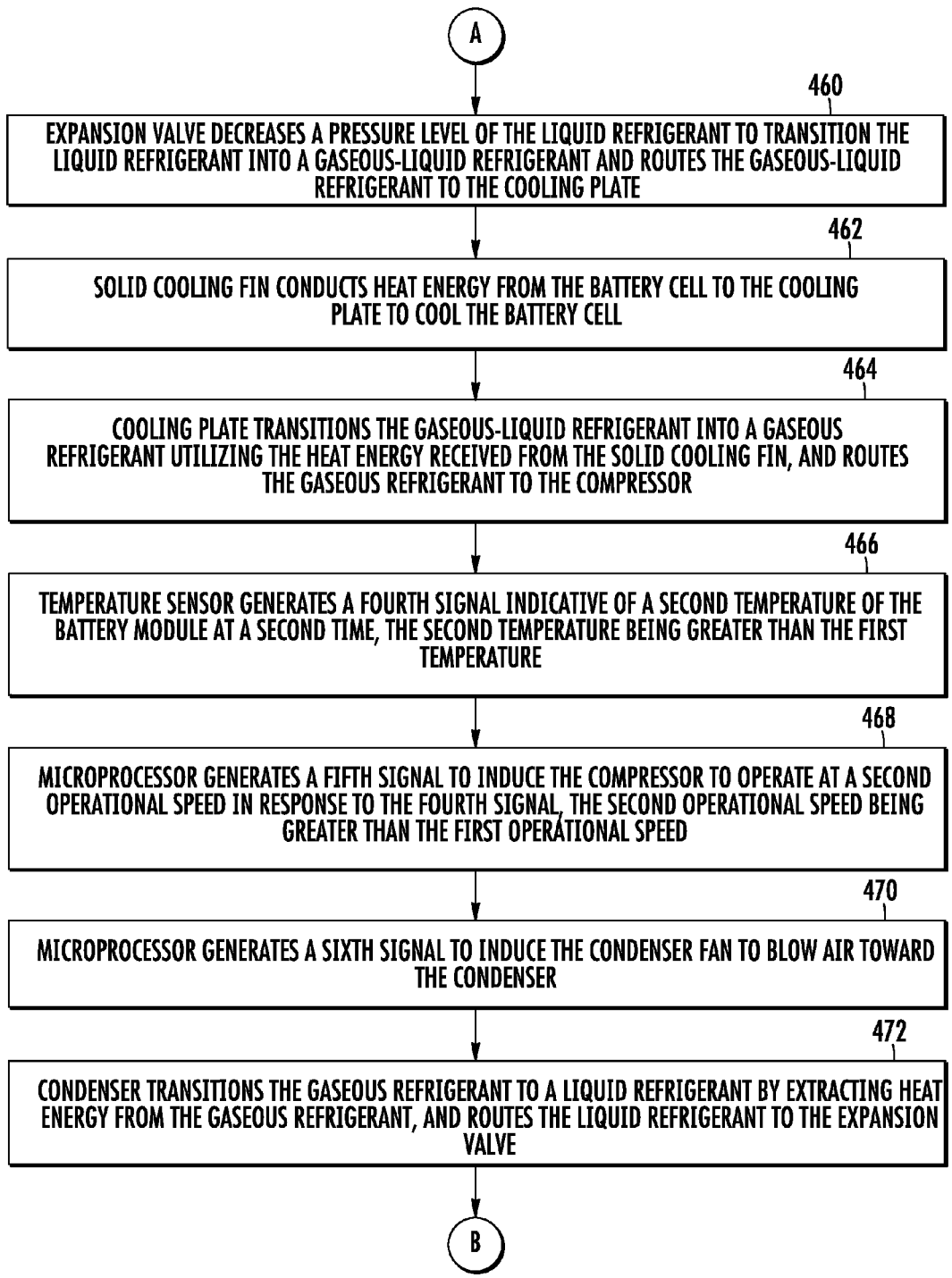
Figure 14:
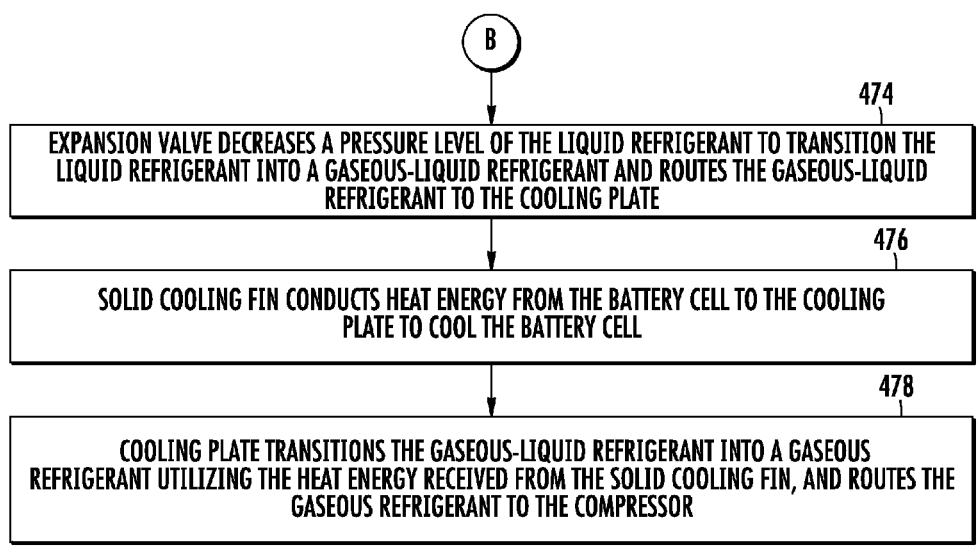

Referring to FIGS. 5-7, the battery modules 40, 42, 44, 46, 48, 49 are provided to generate operational voltages for either an electric vehicle or a hybrid electric vehicle. In one exemplary embodiment, the battery modules 40-49 are electrically coupled in series with one another. The structure each of the battery modules 40-49 is identical to one another. Accordingly, only the structure of the battery module 40 will be discussed in greater detail below for purposes of simplicity. The battery module 40 includes battery cells 180, 182, 184, 186, 188, 190, 192, 194, 196, 198, 200, 202, 204, 206, 208, solid cooling fins 230, 232, 234, 236, 238, 240, 242, 244, and the housing 270.

Since each battery cells 180-208 of battery module 40 have an identical structure, only the structure of the battery cell 180 will be described in further detail. As shown, the battery cell 180 includes a body portion 271 and first and second electrodes (not shown). The body portion 271 is generally rectangular-shaped, and the first and second electrodes extend from a top portion of the body portion 271. In one exemplary embodiment, each battery cell is a lithium-ion battery cell. In alternative embodiments, the battery cells 180-208 could be nickel-cadmium battery cells or nickel metal hydride battery cells for example. Of course, other types of battery cells known to those skilled in the art could be utilized.

The solid cooling fins 230-244 in the battery module 40 are provided to conduct heat energy from the battery cells 180-208 to the cooling plate 26. The structure of each of the solid cooling fins 230-240 is identical to one another. Accordingly, only the structure of the solid cooling fin 230 will be described in greater detail below. The solid cooling fan 230 includes a first panel portion 280 and a second panel portion 282. The first panel portion 280 a substantially rectangular-shaped and is configured to be disposed against adjacent rectangular-shaped surfaces of the battery cells 180, 182. The first panel portion 280 has a sufficient size to cover substantially all of the adjacent rectangular-shaped surface of the battery cell 180, and to cover substantially all of the adjacent rectangular-shaped surface of the battery cell 182. During operation, the first panel portion 280 conducts heat energy from the battery cells 180, 182 to the second panel portion 282. The second panel portion 282 extends from the first panel portion 280 substantially perpendicular to the first panel portion 280. The second panel portion 282 is disposed on the second side 122 of the plate portion 100 of the cooling plate 26. During operation, the second panel portion 282 conducts heat energy from the first panel portion of 280 and the battery cells 180, 182 to the plate portion 100 of the cooling plate 26. In one exemplary embodiment, the solid cooling fins 230-244 are constructed of graphite. Of course, in alternative embodiments, the solid cooling fins 230-244 can be constructed of other thermally conductive materials such as aluminum or copper or a combination thereof for example.

The housing 270 of the battery module 40 is provided to hold the battery cells 180-208 and the first panel portions 280 of the solid cooling fins 230-244 therein. The second panel portions 282 of the solid cooling fins 230-244 extend through the housing 270 and are disposed on the cooling plate 26. The housing 270 is constructed of housing portions 300, 302, 304, 306, 308, 310, 312 that are fixedly coupled together. In one exemplary embodiment, the housing portions 300-312 are constructed of plastic. Of course, other materials known to those skilled in the art could be utilized to construct the housing portions 300-312.

Referring to FIG. 1, the temperature sensor 60 is provided to generate a signal indicative of a temperature level of the battery cell 192 (shown in FIG. 7) in the battery module 40 that is received by the microprocessor 80. Of course, additional temperature sensors could be utilized in the battery module 40 to measure temperature levels of additional battery cells therein.

The temperature sensor 61 is provided to generate a signal indicative of a temperature level of a battery cell in the battery module 42 that is received by the microprocessor 80. Of course, additional temperature sensors could be utilized in the battery module 42 to measure temperature levels of additional battery cells therein.

The condenser fans 70, 71 are provided to blow air past the condenser 23 to cool the condenser 23 in response to a control signal from the microprocessor 80. As shown, the condenser fans 70, 71 are disposed proximate to the condenser 23.

The microprocessor 80 is provided to control operation of the battery system 10. In particular, the microprocessor 40 is configured to generate control signals for controlling operation of the compressor 22 and the condenser fans 70, 71, in response to signals from the temperature sensors 57, 58, 60, 61, as will be explained in greater detail below. The microprocessor 80 utilizes a memory device 81 that stores software instructions and associated data for implementing the methods described below.

Referring to FIGS. 1, 2, 4, 5 and 11, the external enclosure 90 is provided to hold the remaining components of the battery system 10 therein. The external enclosure 90 includes a bottom enclosure portion 350, first and second interior walls 354, 356, a first top enclosure portion 360, a second top enclosure portion 362, and a third top enclosure portion 364.

The first top enclosure portion 360 is coupled to the first and second interior walls 354, 356 and to the bottom enclosure portion 350 to define a first airtight enclosed region 370. The battery modules 40, 42, 44, 46, 48, 49 and the temperature sensor 60 are disposed in the first airtight enclosed region 370.

The second top enclosure portion 362 is coupled to the first interior wall 354 and to the bottom enclosure portion 350 to define a second enclosed region 372. The compressor 22, the condenser 23, the expansion valve 24, and the condenser fans 70, 71 are disposed in the second enclosed region.

The third top enclosure portion 364 is coupled to the second interior wall 356 and to the bottom enclosure portion 350 to define a third enclosed region 374. The microprocessor 80 is disposed in the third enclosed region 374.

Referring to FIGS. 1, 10 and 12-14, a flowchart of a method for cooling the battery system 10 in accordance with another exemplary embodiment will be explained. The following method will be described utilizing a single battery module for purposes of simplicity. However, it should be understood that the method could be implemented utilizing a plurality of battery modules.

At step 450, the battery system 10 has the battery module 40, the cooling plate 26, the compressor 22, the condenser 23, the expansion valve 24, the temperature sensor 60, the condenser fan 70, and the microprocessor 80. The compressor 22 is fluidly coupled to the condenser 23, the expansion valve 24, and the cooling plate 26. The battery module 40 has the housing 270, the battery cell 180, and the solid cooling fin 230. The cooling plate 26 has the conduit 110 therein. The solid cooling fin 230 has first and second panel portions 280, 282. The first panel portion 280 is disposed against the battery cell 180. The second panel portion 282 extends through the housing 270 and is disposed on the cooling plate 26. After step 450, the method advances to step 452.

At step 452, the temperature sensor 60 generates a first signal indicative of a first temperature of the battery module 40 at a first time. After step 452, the method advances to step 454.

At step 454, the microprocessor 80 generates a second signal to induce the compressor 22 to operate at a first operational speed in response to the first signal. The compressor 22 pumps the gaseous refrigerant 91 into the condenser 23. After step 454, the method advances to step 456.

At step 456, the microprocessor 80 generates a third signal to induce the condenser fan 70 to blow air toward the condenser 23. After step 456, the method advances to step 458.

At step 458, the condenser 23 transitions the gaseous refrigerant 91 to the liquid refrigerant 92 by extracting heat energy from the gaseous refrigerant 91, and routes the liquid refrigerant 92 to the expansion valve 24. After step 458, the method advances to step 460.

At step 460, the expansion valve 24 decreases a pressure level of the liquid refrigerant 92 to transition the liquid refrigerant 92 into a gaseous-liquid refrigerant 93, and routes the gaseous-liquid refrigerant 93 to the cooling plate 26. After step 460, the method advances to step 462.

At step 462, the solid cooling fin 230 conducts heat energy from the battery cell 180 to the cooling plate 26 to cool the battery cell 180. After step 462, the method advances to step 464.

At step 464, the cooling plate 26 transitions the gaseous-liquid refrigerant 93 into the gaseous refrigerant 91 utilizing the heat energy received from the solid cooling fin 230, and routes the gaseous refrigerant 91 to the compressor 22. After step 464, the method advances to step 466.

At step 466, the temperature sensor 60 generates a fourth signal indicative of a second temperature of the battery module 40 at a second time. The second temperature is greater than the first temperature. After step 466, the method advances to step 468.

At step 468, the microprocessor 80 generates a fifth signal to induce the compressor 22 to operate at a second operational speed in response to the fourth signal. The second operational speed is greater than the first operational speed. After step 468, the method advances to step 470.

At step 470, the microprocessor 80 generates a sixth signal to induce the condenser fan 70 to blow air toward the condenser 23. After step 470, the method advances to step 472.

At step 472, the condenser 23 transitions the gaseous refrigerant 91 to the liquid refrigerant 92 by extracting heat energy from the gaseous refrigerant 91, and routes the liquid refrigerant 92 to the expansion valve 24. After step 472, the method advances to step 474.

At step 474, the expansion valve 24 decreases a pressure level of the liquid refrigerant 92 to transition the liquid refrigerant 92 into the gaseous-liquid refrigerant 93, and routes the gaseous liquid refrigerant 93 to the cooling plate 26. After step 474, the method advances step 476.

At step 476, the solid cooling fin 230 conducts heat energy from the battery cell 180 to the cooling plate 26 to cool the battery cell 180. After step 476, the method advances to step 478.

At step 478, the cooling plate 26 transitions the gaseous-liquid refrigerant 93 into the gaseous refrigerant 91 utilizing the heat energy received from the solid cooling fin 230, and routes the gaseous refrigerant 91 to the compressor 22.

Figure 15:
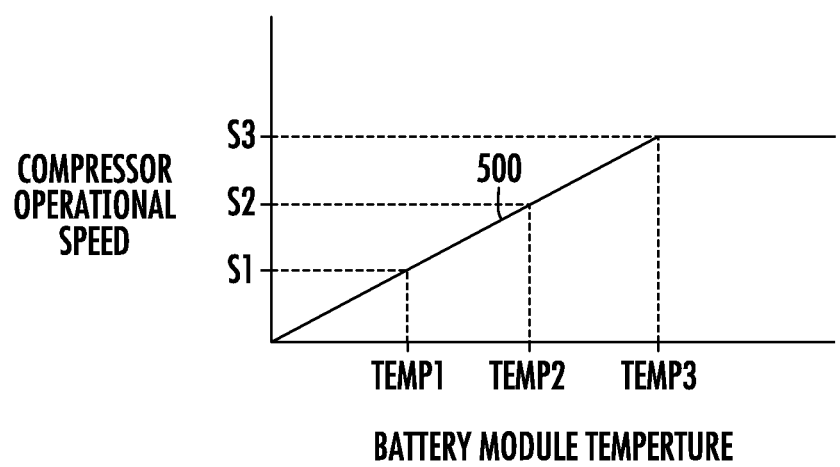
FIG. 15 is a graph of an operational curve associated with a compressor utilized in the battery system of FIG. 1.

Referring to FIG. 15, a graph illustrating an operational curve 500 associated with the compressor 22 (shown in FIG. 1) utilized in the battery system 10 will be explained. When the microprocessor 80 determines that a temperature of the battery module 40 is at a temperature level Temp1, the microprocessor 80 generates a control signal to induce the compressor 22 to operate at an operational speed S1. Further, when the microprocessor 80 determines that a temperature of the battery module 40 is at a temperature level Temp2, which is greater than Temp1, the microprocessor 80 generates a control signal to induce the compressor 22 to operate at an operational speed S2, which is greater than S1. Further, when the microprocessor 80 determines that a temperature of the battery module 40 is at a temperature level Temp3, which is greater than Temp2, the microprocessor 80 generates a control signal to induce the compressor 22 to operate at an operational speed S3, which is greater than S2.

Referring to FIGS. 16-26, flowcharts of a method for cooling the battery system 10 in accordance with another exemplary embodiment will be explained.

Figure 16:
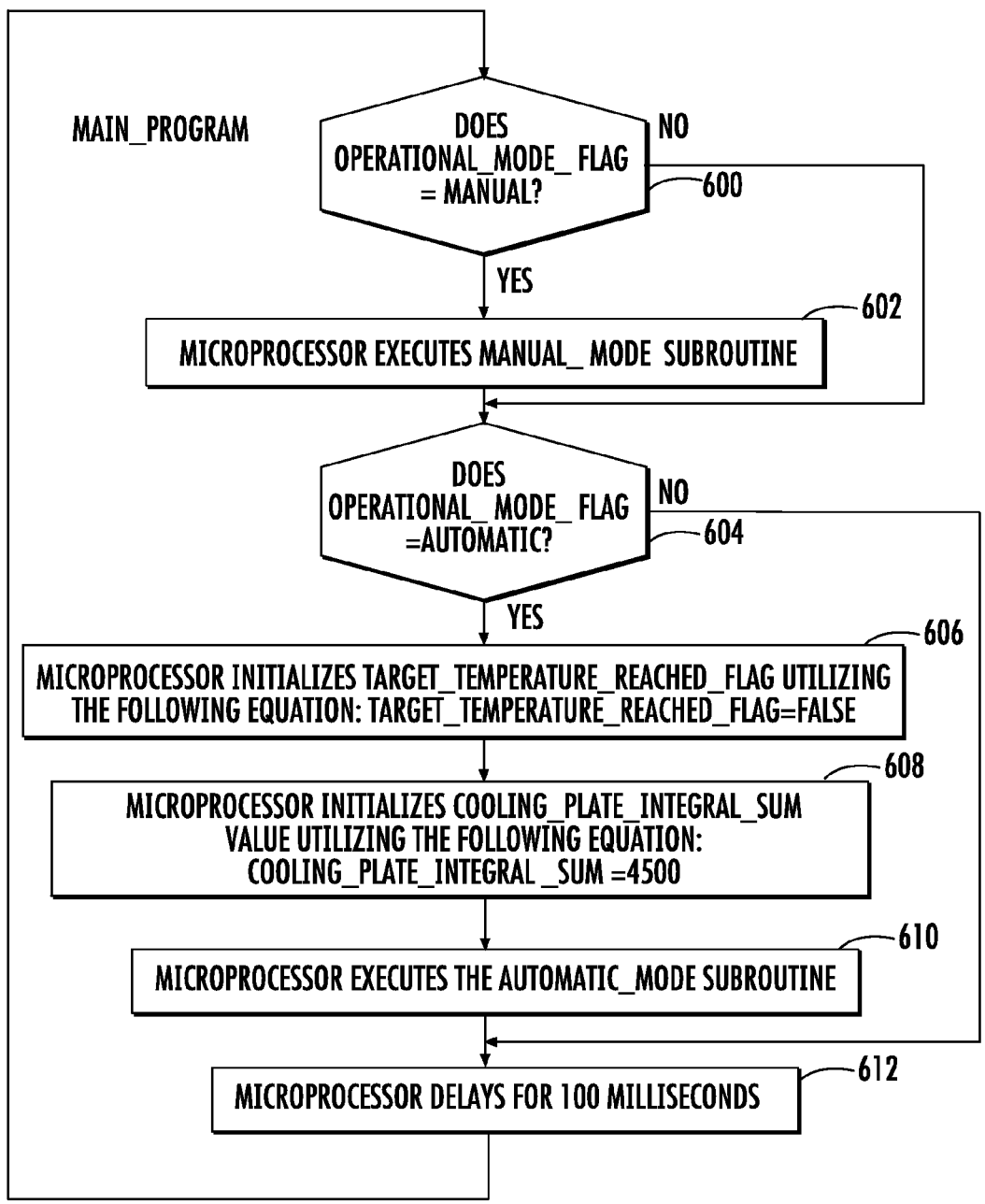
FIGS. 16-26 are flowcharts of a method for cooling the battery system of FIG. 1 in accordance with another exemplary embodiment.

Referring to FIGS. 1 and 16, the steps 600-608 associated with a main_program will now be explained.

At step 600, the microprocessor 80 makes a determination as to whether the operational_mode_flag is equal to "manual." If the value of step 600 equals "yes", the method advances to step 602. Otherwise, the method advances to step 604.

At step 602, the microprocessor 80 executes the manual_mode subroutine which controls the compressor 22 based on inputted commands received from a user via the input device 82. After step 602, the method advances to step 604.

At step 604, the microprocessor 80 makes a determination as to whether the operational_mode_flag is equal to "automatic." If the value of step 604 equals "yes", the method advances to step 606. Otherwise, the method advances to step 612.

At step 606, the microprocessor 80 initializes the target_temperature_reached_flag utilizing the following equation: target_temperature_reached_flag=false. After step 606, the method advances to step 608.

At step 608, the microprocessor 80 initializes the cooling_plate_integral_sum value utilizing the following equation: cooling_plate_integral_sum=4500. After step 608, the method advances to step 610.

At step 610, the microprocessor 80 executes the automatic_mode subroutine. After step 610, the method advances to step 612.

At step 612, the microprocessor 80 delays for 100 milliseconds. After step 612, the method returns to step 600.

Figure 17:
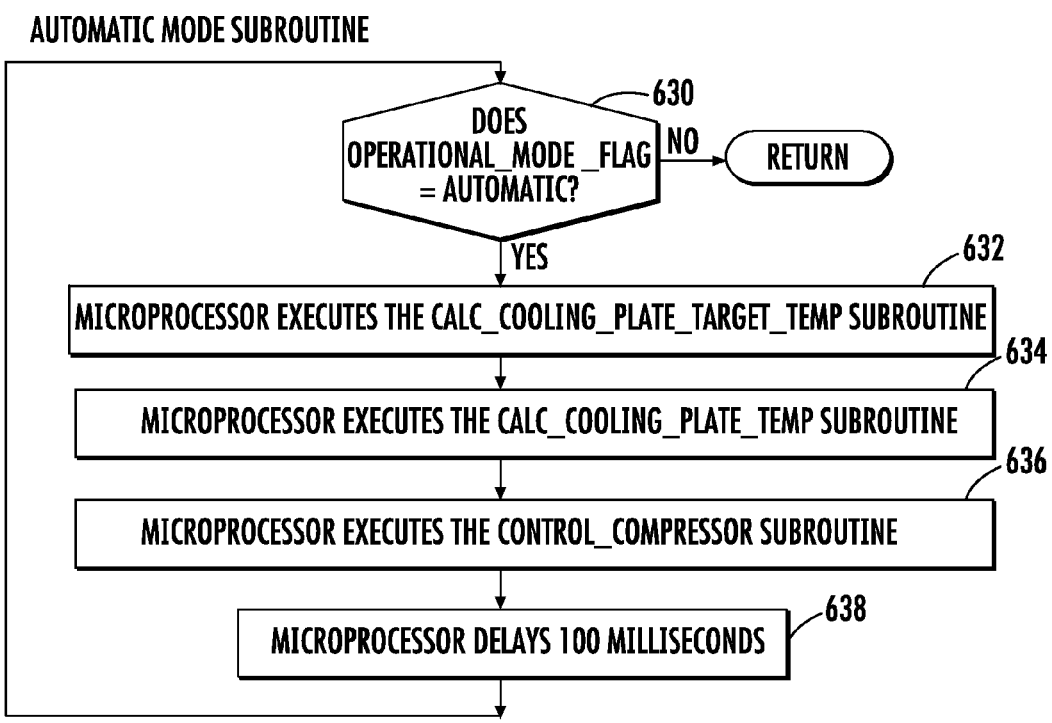
Figure 18:
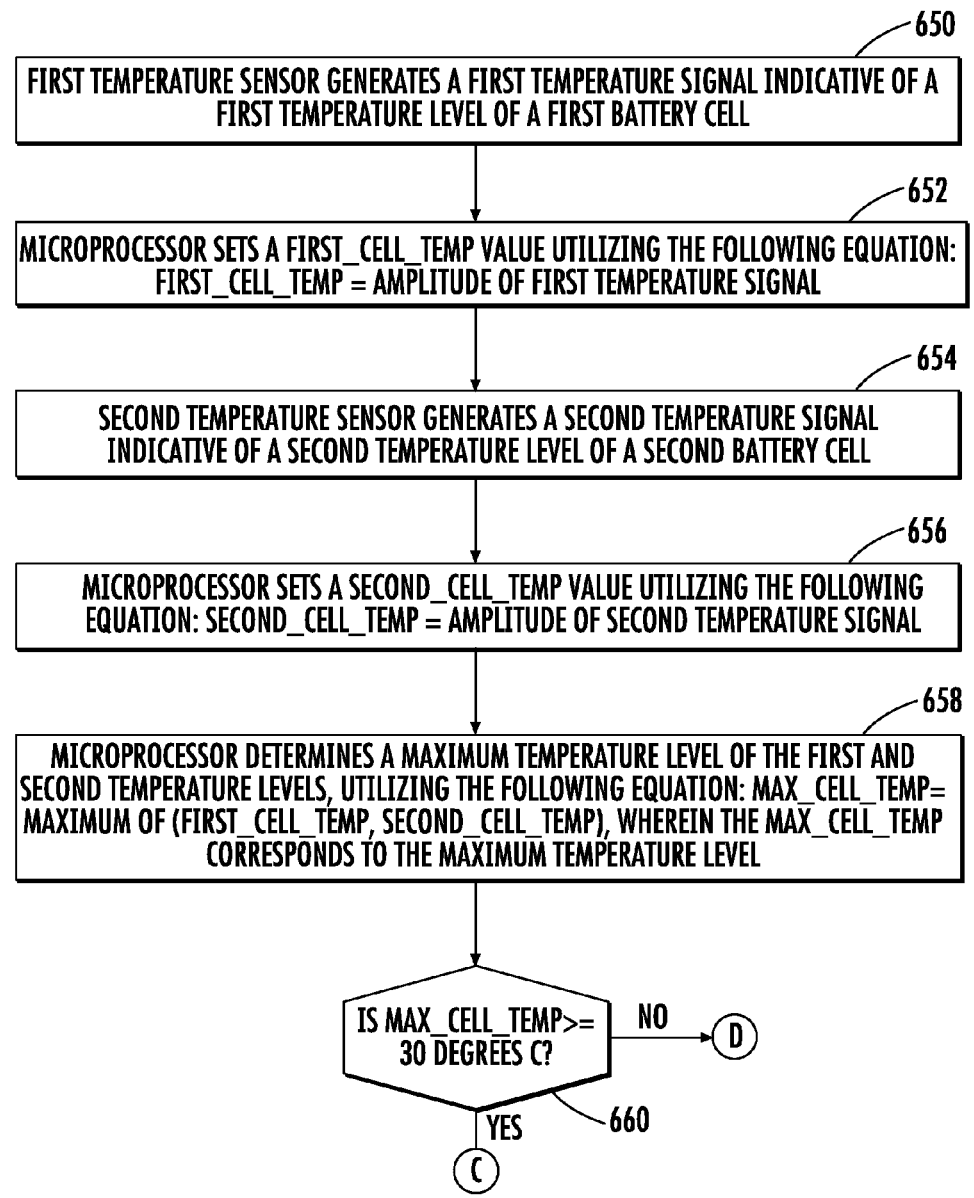
Figure 19:
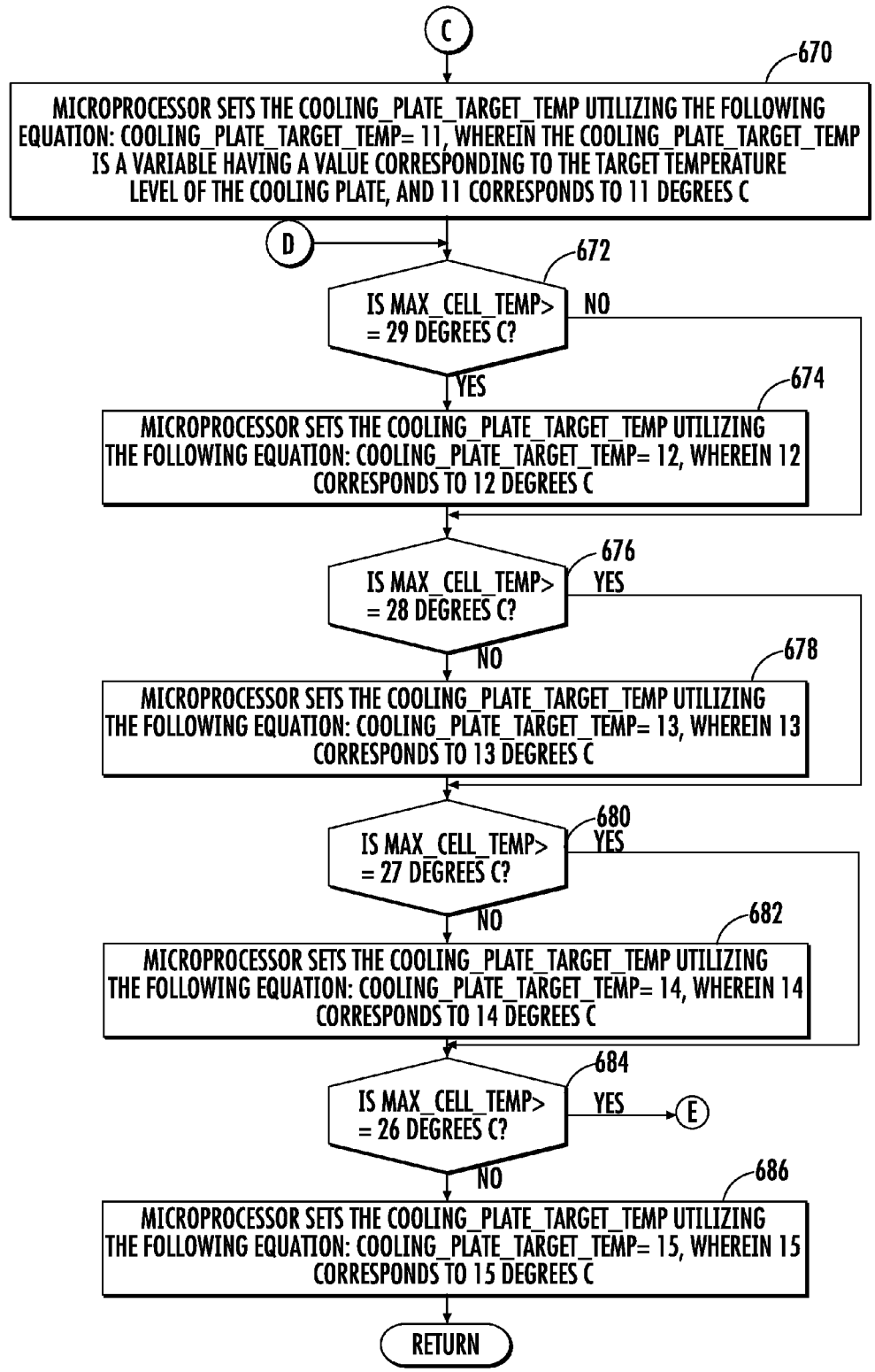
Figure 20:
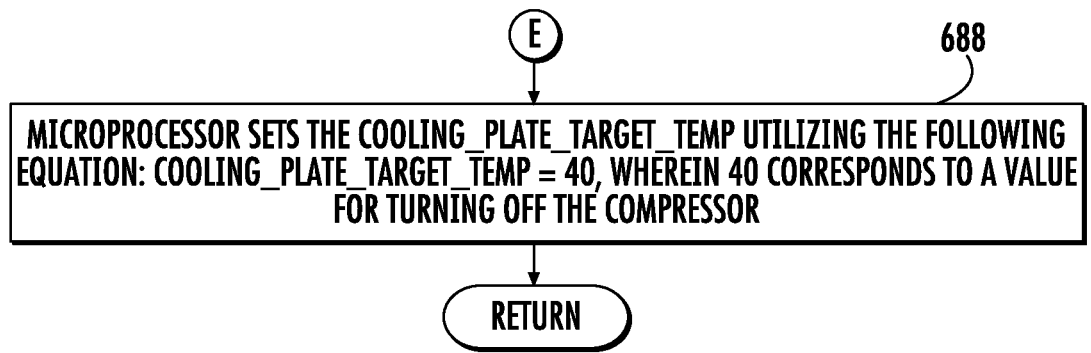

Referring to FIGS. 1 and 17, the steps 630-638 associated with the automatic_mode subroutine will now be explained.

At step 630, the microprocessor 80 makes a determination as to whether the operational_mode_flag is equal to "automatic." If the value of step 630 equals "yes", the method advances to step 632. Otherwise, the method advances to step 612 (shown in FIG. 16).

At step 632, the microprocessor 80 executes the calc_cooling_plate_target_temp subroutine. After step 632, the method advances to step 634.

At step 634, the microprocessor 80 executes the calc_cooling_plate_temp subroutine. After step 634, the method advances to step 636.

At step 636, the microprocessor 80 executes the control_compressor subroutine. After step 636, the method advances to step 638.

At step 638, the microprocessor 80 delays 100 milliseconds. After step 638, the method returns to step 630.

Referring to FIGS. 1 and 18-20, the steps 650-688 associated with the calc_cooling_plate_target_temp subroutine will now be explained.

At step 650, the temperature sensor 57 generates a first temperature signal indicative of a first temperature level of the battery cell 192. After step 650, the method advances to step 652.

At step 652, the microprocessor 80 sets a first_cell_temp value utilizing the following equation: first_cell_temp=amplitude of first temperature signal. After step 652, the method advances to step 654.

At step 654, the temperature sensor 58 generates a second temperature signal indicative of a second temperature level of another battery cell. After step 654, the method advances to step 656.

At step 656, the microprocessor 80 sets a second_cell_temp value utilizing the following equation: second_cell_temp=amplitude of second temperature signal. After step 656, the method advances to step 658.

At step 658, the microprocessor 80 determines a maximum temperature level of the first and second temperature levels, utilizing the following equation: max_cell_temp=maximum of (first_cell_temp, second_cell_temp), wherein the max_cell_temp corresponds to the maximum temperature level. After step 658, the method advances to step 660.

At step 660, the microprocessor 80 makes a determination as to whether the max_cell_temp is greater than or equal to 30 degrees Celsius (C). If the value of step 660 equals "yes", the method advances to step 670. Otherwise, the method advances to step 672.

At step 670, the microprocessor 80 sets the cooling_plate_target_temp utilizing the following equation: cooling_plate_target_temp=11, wherein the cooling_plate_target_temp is a variable having a value corresponding to the target temperature level of the cooling plate, and 11 corresponds to 11 degrees C. After step 670, the method advances to step 672.

At step 672, the microprocessor 80 makes a determination as to whether the max_cell_temp is greater than or equal to 29 degrees C. If the value of step 672 equals "yes", the method advances to step 674. Otherwise, the method advances to step 676.

At step 674, the microprocessor 80 sets the cooling_plate_target_temp utilizing the following equation: cooling_plate_target_temp=12, wherein 12 corresponds to 12 degrees C. After step 674, the method advances to step 676.

At step 676, the microprocessor 80 makes a determination as to whether the max_cell_temp is greater than or equal to 28 degrees C. If the value of step 676 equals "yes", the method advances to step 678. Otherwise, the method advances to step 680.

At step 678, the microprocessor 80 sets the cooling_plate_target_temp utilizing the following equation: cooling_plate_target_temp=13, wherein 13 corresponds to 13 degrees C. After step 678, the method advances to step 680.

At step 680, the microprocessor 80 makes a determination as to whether the max_cell_temp is greater than or equal to 27 degrees C. If the value of step 680 equals "yes", the method advances to step 682. Otherwise, the method advances to step 684.

At step 682, the microprocessor 80 sets the cooling_plate_target_temp utilizing the following equation: cooling_plate_target_temp=14, wherein 14 corresponds to 14 degrees C. After step 682, the method advances to step 684.

At step 684, the microprocessor 80 makes a determination as to whether the max_cell_temp is greater than or equal to 26 degrees C. If the value of step 684 equals "yes", the method advances to step 686. Otherwise, the method advances to step 688.

At step 686, the microprocessor 80 sets the cooling_plate_target_temp utilizing the following equation: cooling_plate_target_temp=15, wherein 15 corresponds to 15 degrees C. After step 686, the method advances to step 623 (shown in FIG. 17).

Referring again to step 684, if the value of step 684 equals "no", the method advances to step 688. At step 688, the microprocessor 80 sets the cooling_plate_target_temp utilizing the following equation: cooling_plate_target_temp=40, wherein 40 corresponds to a value for turning off the compressor 22. After step 688, the method advances to step 634 (shown in FIG. 17).

Figure 21:
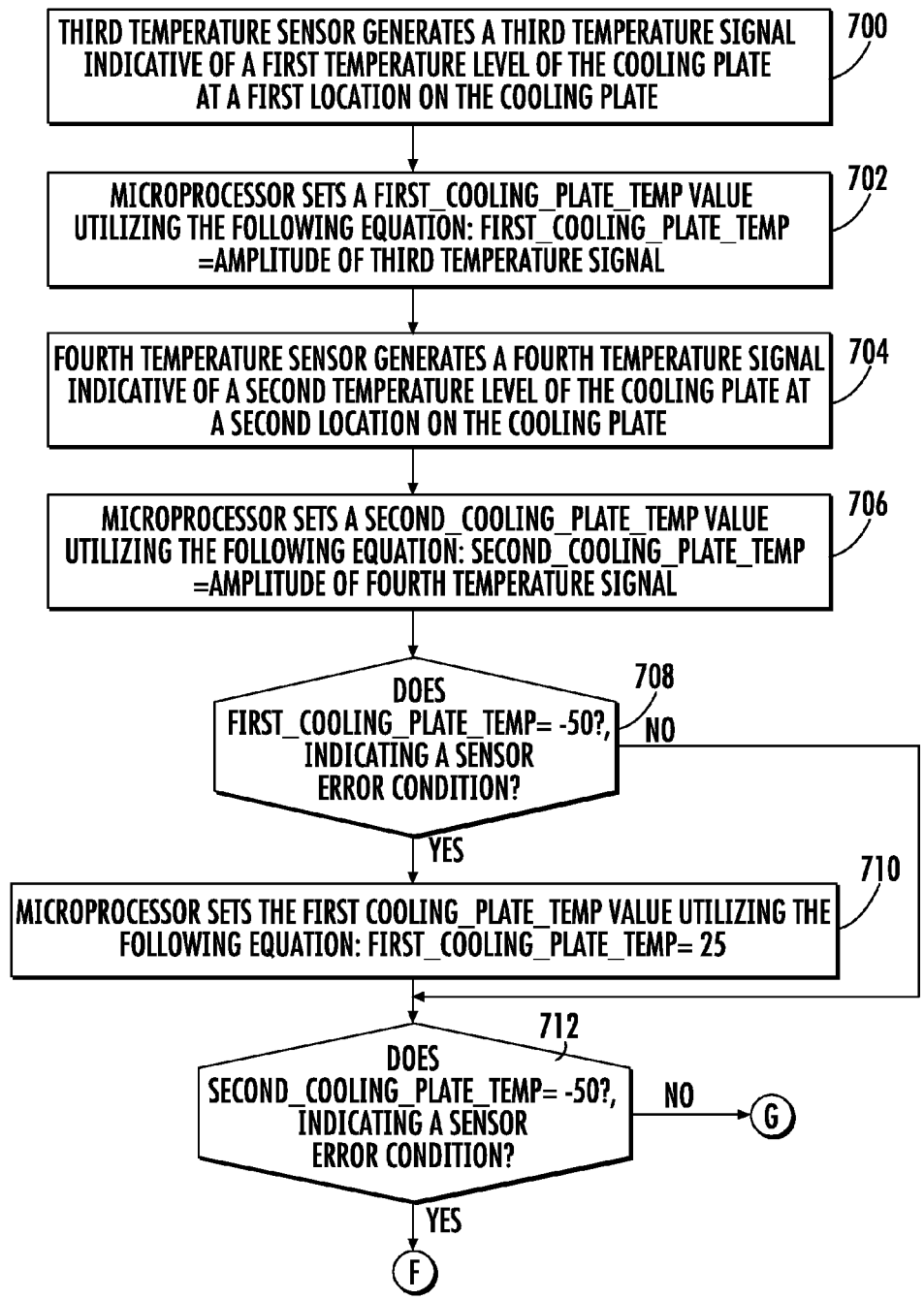
Figure 22:
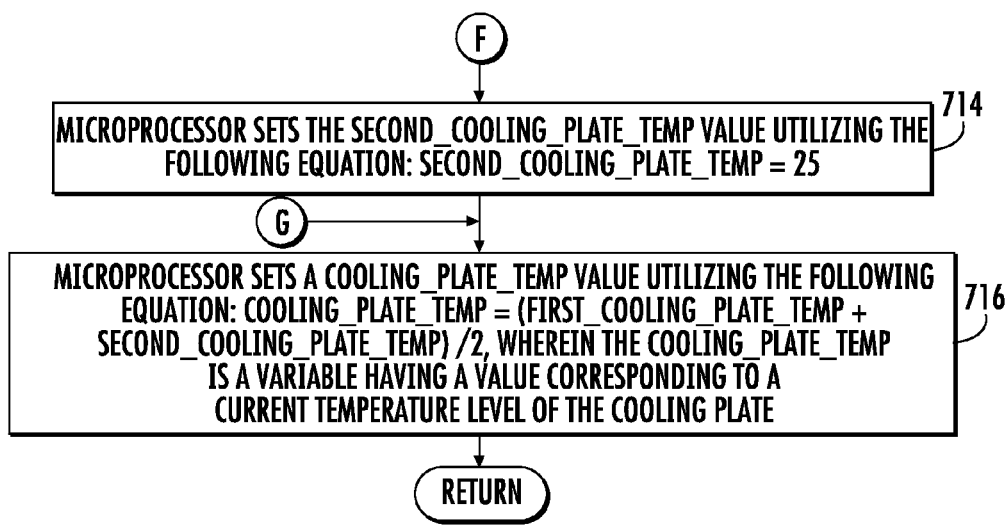

Referring to FIGS. 21-22, the steps 700-716 associated with the calc_cooling_plate_temp subroutine will now be explained.

At step 700, the temperature sensor 60 generates a third temperature signal indicative of a first temperature level of the cooling plate 26 at a first location on the cooling plate 26. After step 700, the method advances to step 702.

At step 702, the microprocessor 80 sets a first_cooling_plate_temp value utilizing the following equation: first_cooling_plate_temp=amplitude of third temperature signal. After step 702, the method advances to step 704.

At step 704, the temperature sensor 61 generates a fourth temperature signal indicative of a second temperature level of the cooling plate 26 at a second location on the cooling plate 26. After step 704, the method advances to step 706.

At step 706, the microprocessor 80 sets a second_cooling_plate_temp value utilizing the following equation: second_cooling_plate_temp=amplitude of fourth temperature signal. After step 706, the method advances to step 708.

At step 708, the microprocessor 80 makes a determination as to whether the first_cooling_plate_temp is equal to −50, indicating a sensor error condition. If the value of step 708 equals "yes", the method advances to step 710. Otherwise, the method advances to step 712.

At step 710, the microprocessor 80 sets the first_cooling_plate_temp value utilizing the following equation: first_cooling_plate_temp=25. After step 710, the method advances to step 712.

At step 712, the microprocessor 80 makes a determination as to whether the second_cooling_plate_temp is equal to −50, indicating a sensor error condition. If the value of step 712 equals "yes", the method advances to step 714. Otherwise, the method advances to step 716.

At step 714, the microprocessor 80 sets the second_cooling_plate_temp value utilizing the following equation: second_cooling_plate_temp=25. After step 714, the method advances to step 716.

At step 716, the microprocessor 80 sets a cooling_plate_temp value utilizing the following equation: cooling_plate_temp=(first_cooling_plate_temp+second_cooling_plate_temp)/2, wherein the cooling_plate_temp is a variable having a value corresponding to a current temperature level of the cooling plate. After step 716, the method advances to step 636 (shown in FIG. 17).

Figure 23:
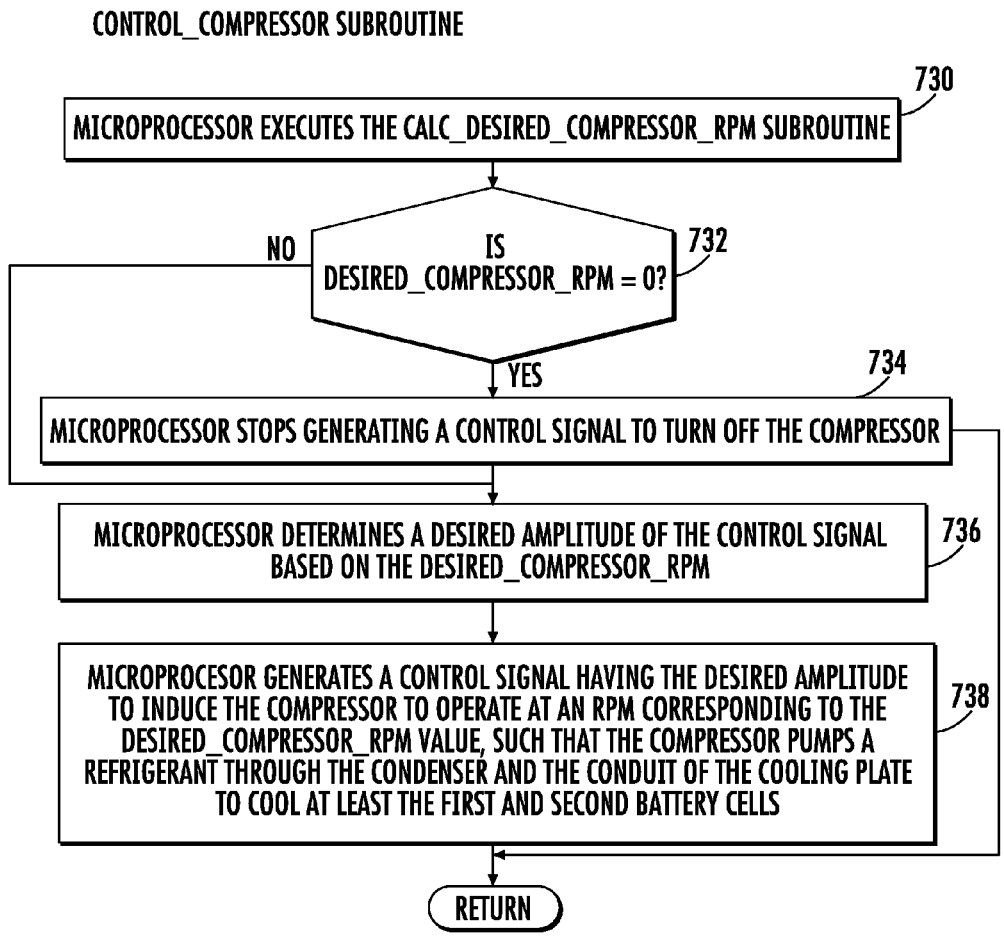

Referring to FIGS. 1 and 23, the steps 730-738 associated with the control_compressor subroutine will now be explained.

At step 730, the microprocessor 80 executes the calc_desired_compressor_RPM subroutine. After step 730, the method advances to step 732.

At step 732, the microprocessor 80 makes a determination as to whether the desired_compressor_RPM is equal to 0. If the value of step 732 equals "yes", the method advances to step 734. Otherwise, the method advances to step 736.

At step 734, the microprocessor 80 stops generating a control signal to turn off the compressor 22. After step 734, the method advances to step 638 (shown in FIG. 17).

At step 736, the microprocessor 80 determines a desired amplitude of the control signal based on the desired_compressor_RPM. After step 736, the method advances to step 738.

At step 738, the microprocessor 80 generates a control signal having the desired amplitude to induce the compressor 22 to operate at an RPM corresponding to the desired_compressor_RPM value, such that the compressor 22 pumps a refrigerant through the condenser 23 and the conduit of the cooling plate 26 to cool at least the battery cell 192 and another battery cell. After step 738, the method advances to step 638 (shown in FIG. 17).

Figure 24:
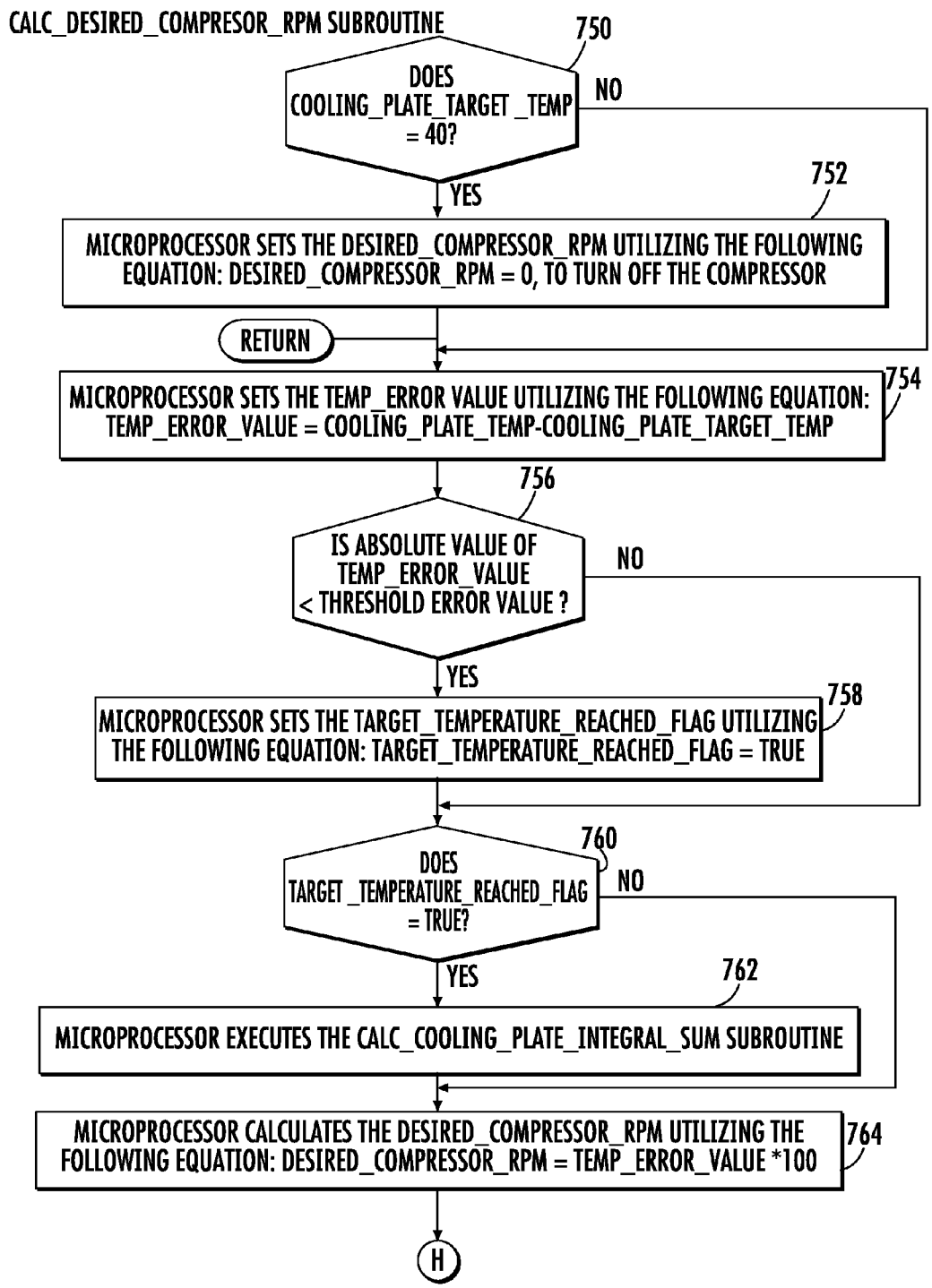
Figure 25:
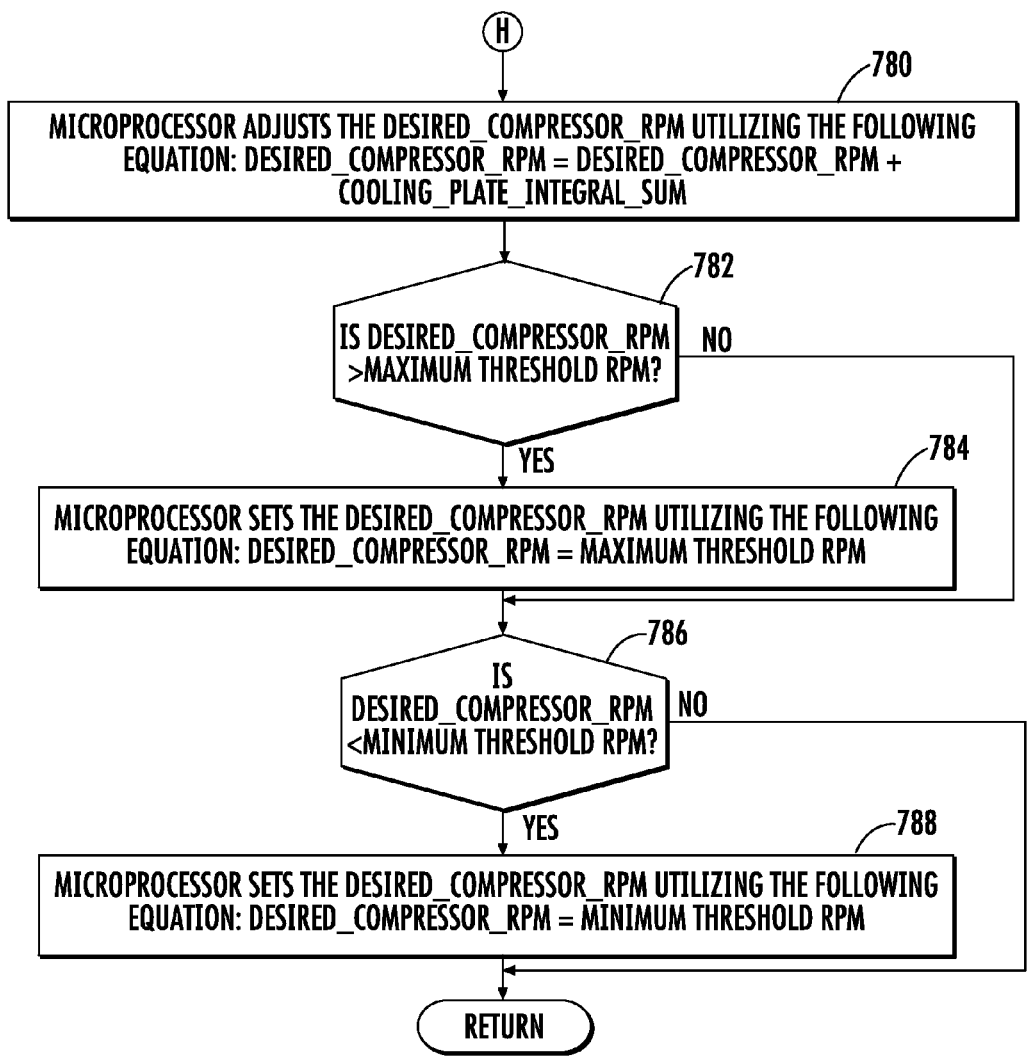

Referring to FIGS. 1 and 24-25, the steps 750-788 associated with the calc_desired_compressor_RPM subroutine will now be explained.

At step 750, the microprocessor 80 makes a determination as to whether the cooling_plate_target_temp is equal to 40. If the value of step 750 equals "yes", the method advances to step 752. Otherwise, the method advances to step 754.

At step 752, the microprocessor 80 sets the desired_compressor_RPM utilizing the following equation: desired_compressor_RPM=0, to turn off the compressor 22. After step 752, the method advances to step 732 (shown in FIG. 23).

Referring again to step 750, if the value of step 750 equals "no", the method advances to step 754. At step 754, the microprocessor 80 sets the temp_error_value utilizing the following equation: temp_error_value=cooling_plate_temp−cooling_plate_target_temp. After step 754, the method advances to step 756.

At step 756, the microprocessor 80 makes a determination as to whether the absolute value of temp_error_value is less than a threshold error value. If the value of step 756 equals "yes", the method advances to step 758. Otherwise, the method advances to step 760.

At step 758, the microprocessor 80 sets the target_temperature_reached_flag utilizing the following equation: target_temperature_reached_flag=true. After step 758, the method advances to step 760.

At step 760, the microprocessor 80 makes a determination as to whether the target_temperature_reached_flag is equal to true. If the value of step 760 equals "yes", the method advances to step 762. Otherwise, the method advances to step 764.

At step 762, the microprocessor 80 executes the calc_cooling_plate_integral_sum subroutine. After step 762, the method advances to step 764.

At step 764, the microprocessor 80 calculates the desired_compressor_RPM utilizing the following equation: desired_compressor_RPM=temp_error_value*100. After step 764, the method advances to step 780.

At step 780, the microprocessor 80 adjusts the desired_compressor_RPM utilizing the following equation: desired_compressor_RPM=desired_compressor_RPM+cooling_plate_integral_sum. After step 780, the method advances to step 782.

At step 782, the microprocessor 80 makes a determination as to whether the desired_compressor_RPM is greater than a maximum threshold RPM. If the value of step 782 equals "yes", the method advances to step 784. Otherwise, the method advances to step 786.

At step 784, the microprocessor 80 sets the desired_compressor_RPM utilizing the following equation: desired_compressor_RPM=maximum threshold RPM. After step 784, the method advances to step 786.

At step 786, the microprocessor 80 makes a determination as to whether the desired_compressor_RPM is less than a minimum threshold RPM. If the value of step 786 equals "yes", the method advances to step 788. Otherwise, the method advances to step 732 (shown in FIG. 23).

At step 788, the microprocessor 80 sets the desired_compressor_RPM utilizing the following equation: desired_compressor_RPM=minimum threshold RPM. After step 788, the method advances to step 732 (shown in FIG. 23).

Figure 26:
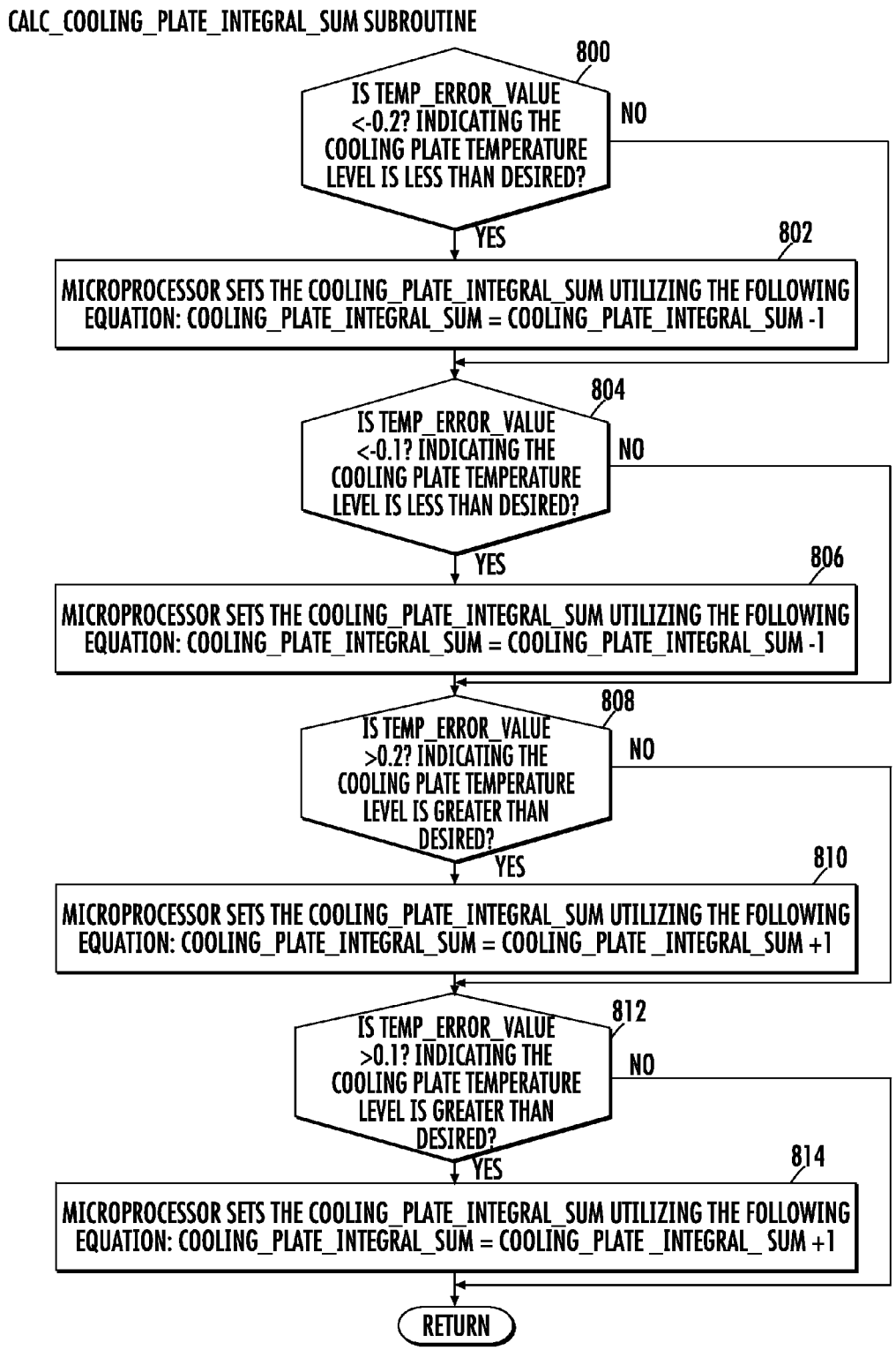

Referring to FIGS. 1 and 26, the steps 800-814 associated with the calc_cooling_plate_integral_sum subroutine will now be explained.

At step 800, the microprocessor 80 makes a determination as to whether the temp_error_value is less than −0.2, indicating the cooling plate temperature level is less than desired. If the value of step 800 equals "yes", the method advances to step 802. Otherwise, the method advances to step 804.

At step 802, the microprocessor 80 sets the cooling_plate_integral_sum utilizing the following equation: cooling_plate_integral_sum=cooling_plate_integral_sum−1. After step 802, the method advances to step 804.

At step 804, the microprocessor 80 makes a determination as to whether the temp_error_value is less than −0.1, indicating the cooling plate temperature level is less than desired. If the value of step 804 equals "yes", the method advances to step 806. Otherwise, the method advances to step 808.

At step 806, the microprocessor 80 sets the cooling_plate_integral_sum utilizing the following equation: cooling_plate_integral_sum=cooling_plate_integral_sum−1. After step 806, the method advances to step 808.

At step 808, the microprocessor 80 makes a determination as to whether the temp_error_value is less than 0.2, indicating the cooling plate temperature level is greater than desired. If the value of step 808 equals "yes", the method advances to step 810. Otherwise, the method advances to step 812.

At step 810, the microprocessor 80 sets the cooling_plate_integral_sum utilizing the following equation: cooling_plate_integral_sum=cooling_plate_integral_sum+1. After step 810, the method advances to step 812.

At step 812, the microprocessor 80 makes a determination as to whether the temp_error_value is greater than 0.1 indicating the cooling plate temperature level is greater than desired. If the value of step 812 equals "yes", the method advances to step 814. Otherwise, the method advances to step 764 (shown in FIG. 24).

At step 814, the microprocessor 80 sets the cooling_plate_integral_sum utilizing the following equation: cooling_plate_integral_sum=cooling_plate_integral_sum+1. After step 814, the method advances to step 764 (shown in FIG. 24).

Figure 27:
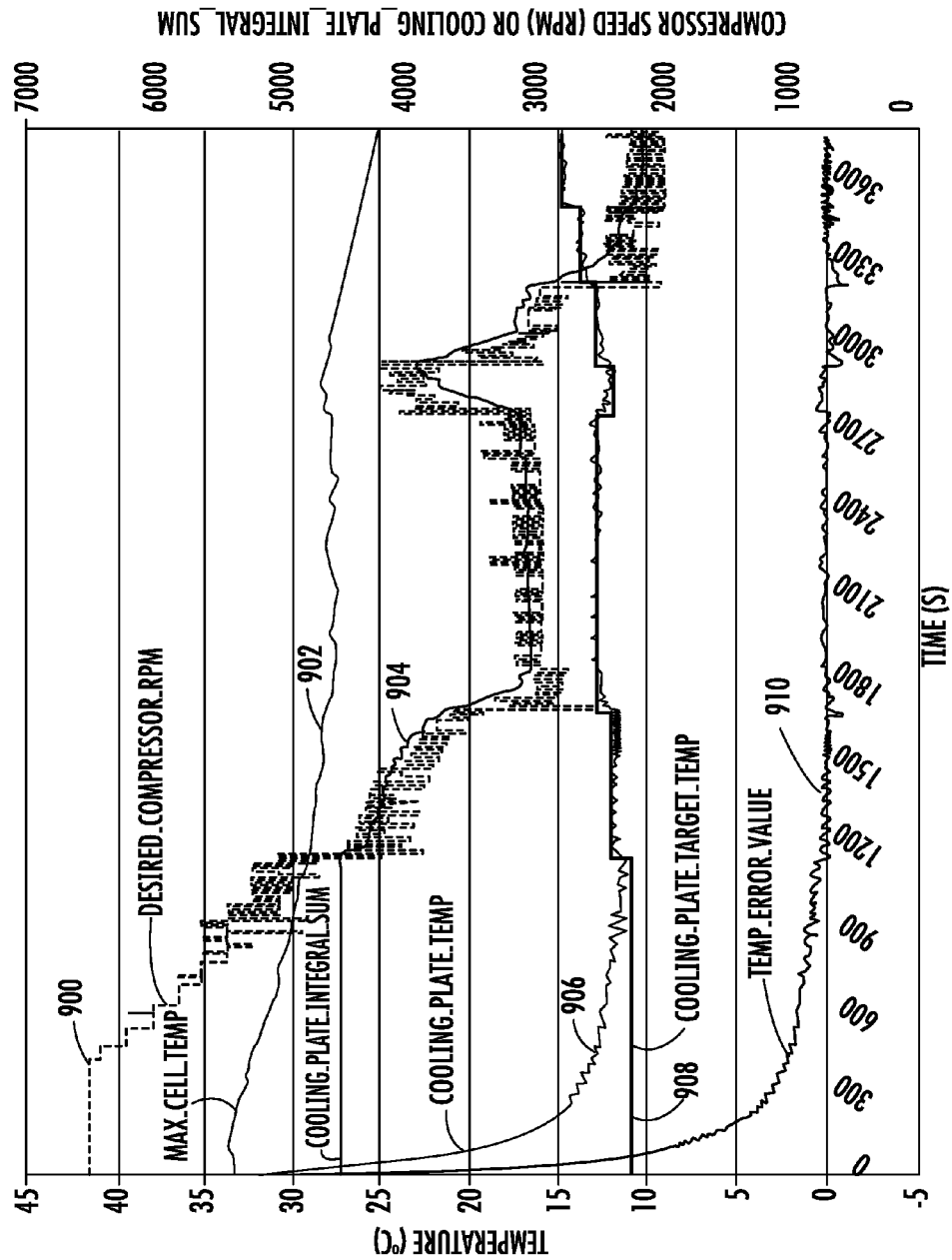
FIG. 27 is a graph of operational curves associated with the flowcharts of FIGS. 16-26.

Referring to FIG. 27, operational curves indicating exemplary operation of the battery system 10 associated with the flowcharts of FIGS. 16-26 is illustrated. In particular, FIG. 27 includes operational curves 900, 902, 904, 906, 908, 910, 912. The operational curve 900 indicates exemplary desired_compressor_RPM values over time. Further, the operational curve 902 indicates exemplary max_cell_temp values over time. The operational curve 904 indicates exemplary cooling_plate_integral_sum values over time. Also, the operational curve 906 indicates exemplary cooling_plate_temp values over time. The operational curve 908 indicates exemplary cooling_plate_target_temp values over time. Further, the operational curve 910 indicates the temp_error_value over time.

The battery system 10 and the method for cooling the battery system 10 provide a substantial advantage over other battery systems and methods. In particular, the battery system 10 utilizes a microprocessor programmed to determine a target temperature level for a cooling plate based on a maximum temperature level of battery cells, and determines a temperature error value based on a difference between the current temperature level of the cooling plate and the target temperature level of the cooling plate, and determines a desired RPM value for the compressor based on the temperature error value, to effectively cool the battery cells in the battery system 10.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery system, comprising:
a cooling plate having a conduit therein;
a battery module having a housing, first and second battery cells, and a solid cooling fin; the housing configured to hold the first and second battery cells therein, the solid cooling fin having first and second panel portions, the first panel portion being disposed against the first battery cell, the second panel portion extending through the housing and being disposed on the cooling plate, the solid cooling fin being configured to conduct heat energy from the first battery cell to the cooling plate;
a compressor fluidly coupled to the conduit of the cooling plate;

a condenser fluidly coupled between both the compressor and the conduit of the cooling plate;

a first temperature sensor adapted to generate a first temperature signal indicative of a first temperature level of the first battery cell;

a second temperature sensor adapted to generate a second temperature signal indicative of a second temperature level of the second battery cell;

a third temperature sensor adapted to generate a third temperature signal indicative of a third temperature level of the cooling plate;

a microprocessor operably coupled to the compressor and the first, second, and third temperature sensors;

the microprocessor being programmed to determine a maximum temperature level of the first and second temperature levels of the first and second battery cells based on the first and second temperature signals;

the microprocessor being further programmed to determine a target temperature level for the cooling plate based on the maximum temperature level associated with the first and second battery cells.

the microprocessor being further programmed to determine a temperature error value based on a difference between the third temperature level of the cooling plate and the target temperature level of the cooling plate;

the microprocessor being further programmed to determine a desired RPM value for the compressor based on the temperature error value; and the microprocessor being further programmed to generate a control signal to induce the compressor to operate at an RPM corresponding to the desired RPM value, such that the compressor pumps a refrigerant through the condenser and the conduit of the cooling plate to cool the first and second battery cells.

2. The battery system of claim 1, wherein:

the microprocessor being further programmed to determine whether an absolute value of the temperature error value is less than a threshold error value; and if the absolute value of the temperature error value is less than the threshold error value then:

the microprocessor being further programmed to adjust a cooling plate integral sum value based on the temperature error value; and the microprocessor being further programmed to adjust the desired RPM value for the compressor based on the cooling plate integral sum value.

3. The battery system of claim 2, wherein the microprocessor being programmed to adjust the cooling plate integral sum value based on the temperature error value, comprises:

the microprocessor being further programmed to decrease the cooling plate integral sum value if the temperature error value is a negative value; and the microprocessor being further programmed to increase the cooling plate integral sum value if the temperature error value is a positive value.

4. The battery system of claim 1, wherein:

the microprocessor being further programmed to determine if the desired RPM value is greater than a maximum threshold RPM value; and if the desired RPM value is greater than the maximum threshold RPM value then:

the microprocessor being further programmed to set the desired RPM value equal to the maximum threshold RPM value.

5. The battery system of claim 4, wherein:

the microprocessor being further programmed to determine if the desired RPM value is less than a minimum threshold RPM value; and if the desired RPM value is less than the minimum threshold RPM value then:

the microprocessor being further programmed to set the desired RPM value equal to the minimum threshold RPM value.

6. The battery system of claim 1, wherein the microprocessor being further programmed to stop generating the control signal, to turn off the compressor, if the maximum temperature value is less than a threshold temperature value.

7. The battery system of claim 1, wherein the third temperature sensor generates the third temperature signal indicative of a temperature level of the cooling plate at a first location on the cooling plate; the system further comprising:

a fourth temperature sensor adapted to generate a fourth temperature signal indicative of a temperature level of the cooling plate at a second location on the cooling plate; and the microprocessor further programmed to determine the third temperature level of the cooling plate based on the third and fourth temperature signals.

8. A method for cooling a battery system, the battery system having a cooling plate, a battery module, a compressor, a condenser, first, second, and third temperature sensors, and a microprocessor; the cooling plate having a conduit therein; the battery module having a housing, first and second battery cells, and a solid cooling fin; the housing configured to hold the first and second battery cells therein, the solid cooling fin having first and second panel portions, the first panel portion being disposed against the first battery cell, the second panel portion extending through the housing and being disposed on the cooling plate, the solid cooling fin being configured to conduct heat energy from the first battery cell to the cooling plate; the compressor fluidly coupled to the conduit of the cooling plate; the condenser fluidly coupled between both the compressor and the conduit of the cooling plate;

generating a first temperature signal indicative of a first temperature level of the first battery cell, utilizing the first temperature sensor;

generating a second temperature signal indicative of a second temperature level of the second battery cell, utilizing the second temperature sensor;

generating a third temperature signal indicative of a third temperature level of the cooling plate, utilizing the third temperature sensor;

determining a maximum temperature level of the first and second temperature levels of the first and second battery cells based on the first and second temperature signals, utilizing the microprocessor;

determining a target temperature level for the cooling plate based on the maximum temperature level associated with the first and second battery cells, utilizing the microprocessor;

determining a temperature error value based on a difference between the third temperature level of the cooling plate and the target temperature level of the cooling plate, utilizing the microprocessor;

determining a desired RPM value for the compressor based on the temperature error value, utilizing the microprocessor;

determining whether an absolute value of the temperature error value is less than a threshold error value, utilizing the microprocessor; and if the absolute value of the temperature error value is less than the threshold error value then:

adjusting a cooling plate integral sum value based on the temperature error value, utilizing the microprocessor;

adjusting the desired RPM value for the compressor based on the cooling plate integral sum value, utilizing the microprocessor; and generating a control signal to induce the compressor to operate at an RPM corresponding to the desired RPM value to cool the first and second battery cells, utilizing the microprocessor, such that the compressor pumps a refrigerant through the condenser and the conduit of the cooling plate to cool the first and second battery cells.

9. The method of claim 8, wherein adjusting the cooling plate integral sum value based on temperature error value, comprises:

decreasing the cooling plate integral sum value if the temperature error value is a negative value, utilizing the microprocessor; and increasing the cooling plate integral sum value if the temperature error value is a positive value, utilizing the microprocessor.

10. The method of claim 7, further comprising:

determining if the desired RPM value is greater than a maximum threshold RPM value, utilizing the microprocessor; and if the desired RPM value is greater than the maximum threshold RPM value then:

setting the desired RPM value equal to the maximum threshold RPM value, utilizing the microprocessor.

11. The method of claim 10, further comprising:

determining if the desired RPM value is less than a minimum threshold RPM value, utilizing the microprocessor; and if the desired RPM value is less than the minimum threshold RPM value then:

setting the desired RPM value equal to the minimum threshold RPM value, utilizing the microprocessor.

12. The method of claim 8, further comprising stopping the generating of the control signal, to turn off the compressor, if the maximum temperature value is less than a threshold temperature value, utilizing the microprocessor.

13. The method of claim 8, wherein the third temperature sensor generates the third temperature signal indicative of a temperature level of the cooling plate at a first location on the cooling plate; the method further comprising:

generating a fourth temperature signal indicative of a temperature level of the cooling plate at a second location on the cooling plate, utilizing a fourth temperature sensor; and determining the third temperature level of the cooling plate based on the third and fourth temperature signals, utilizing the microprocessor.

\* \* \* \* \*